(12) United States Patent
Van Der Scheer et al.

(10) Patent No.: US 10,808,390 B2
(45) Date of Patent: Oct. 20, 2020

(54) PLASTIC INFILTRATION UNIT AND SYSTEM

(71) Applicant: Wavin B.V., CW Zwolle (NL)

(72) Inventors: Marco Van Der Scheer, Pm Klijndijk (NL); Berend Jan Van Dijk, Slagharen (NL)

(73) Assignee: Wavin B.V., CW Zwolle (NL)

( * ) Notice: Subject to any disclaimer, the term of this patent is extended or adjusted under 35 U.S.C. 154(b) by 0 days.

(21) Appl. No.: 15/511,918

(22) PCT Filed: Sep. 18, 2015

(86) PCT No.: PCT/EP2015/071462
§ 371 (c)(1),
(2) Date: Mar. 16, 2017

(87) PCT Pub. No.: WO2016/042141
PCT Pub. Date: Mar. 24, 2016

(65) Prior Publication Data
US 2017/0292260 A1    Oct. 12, 2017

(30) Foreign Application Priority Data
Sep. 19, 2014 (NL) ..................................... 1040956

(51) Int. Cl.
*E03F 1/00* (2006.01)
*E02B 11/00* (2006.01)
(52) U.S. Cl.
CPC ............ *E03F 1/005* (2013.01); *E02B 11/005* (2013.01); *Y02A 10/33* (2018.01); *Y02A 20/408* (2018.01)
(58) Field of Classification Search
CPC .......... E02F 1/005; E03F 3/046; E03F 5/0408
(Continued)

(56) References Cited

U.S. PATENT DOCUMENTS 5,810,510 A    9/1998  Urriola
6,694,672 B1 * 2/2004  Hergeth ............... E01C 13/083
                                                         47/65.9
(Continued)

FOREIGN PATENT DOCUMENTS

AU            620283     2/1992
DE    10 2009 004 915 A1   7/2010
(Continued)

OTHER PUBLICATIONS

International Search Report and Written Opinion for International Application No. PCT/EP2015/071462, dated Jan. 28, 2016, 15 pages.
(Continued)

*Primary Examiner* — Benjamin F Fiorello
*Assistant Examiner* — Edwin J Toledo-Duran
(74) *Attorney, Agent, or Firm* — Wolf, Greenfield & Sacks, P.C.

(57) ABSTRACT

There is provided a plastic infiltration unit comprising: a top deck, at least one pillar extending from the top deck, wherein the at least one pillar includes a plurality of compartments, wherein at least one of the compartments is laterally enclosed, and wherein the top deck and the at least one pillar are produced in one piece. There is further provided a plastic base plate for use with a plastic infiltration unit. There is further provided a plastic infiltration unit side plate. There is yet further provided a plastic in filtration system for deployment underground comprising a plastic infiltration unit and a plastic base plate, wherein the at least one pillar of the plastic infiltration unit is received at the receiving location of the plastic base plate.

43 Claims, 19 Drawing Sheets

(58) Field of Classification Search
USPC .................................................. 405/36–51
See application file for complete search history.

(56) References Cited

U.S. PATENT DOCUMENTS

| | | | |
|---|---|---|---|
| 7,712,997 B2 | 5/2010 | Roelfsema | |
| 9,079,708 B2* | 7/2015 | Takai | E03F 1/002 |
| 9,303,365 B2* | 4/2016 | Gooden | A01G 13/0237 |
| 9,506,235 B2* | 11/2016 | Adams | E03F 3/046 |
| 9,708,806 B2* | 7/2017 | Meincke | E03F 1/005 |
| 9,896,832 B2* | 2/2018 | Graf | E03F 1/005 |
| 9,957,987 B2* | 5/2018 | Wandkowski | E03F 1/005 |
| 10,132,069 B2* | 11/2018 | Van Der Scheer | E03F 5/101 |
| 2003/0188505 A1* | 10/2003 | Marshall | E03F 1/005 |
| | | | 52/606 |
| 2005/0155285 A1* | 7/2005 | Urban | E01C 9/005 |
| | | | 47/32.7 |
| 2007/0181197 A1* | 8/2007 | Krichten | E03F 1/005 |
| | | | 137/833 |
| 2007/0274776 A1* | 11/2007 | Urriola | E01C 9/004 |
| | | | 403/364 |
| 2008/0044231 A1* | 2/2008 | Roelfsema | E02B 11/005 |
| | | | 405/129.57 |
| 2008/0166182 A1* | 7/2008 | Smith | E03F 1/005 |
| | | | 405/36 |
| 2009/0250369 A1* | 10/2009 | Guibert | E03F 1/002 |
| | | | 206/507 |
| 2010/0200600 A1* | 8/2010 | Hoekstra | E03F 1/005 |
| | | | 220/676 |
| 2011/0108559 A1* | 5/2011 | Hewing | E02B 11/005 |
| | | | 220/694 |
| 2012/0141203 A1* | 6/2012 | Gooden | E01C 9/004 |
| | | | 404/41 |
| 2012/0255624 A1* | 10/2012 | Canney | E02B 11/005 |
| | | | 137/315.01 |
| 2013/0284750 A1* | 10/2013 | Takai | E03F 1/002 |
| | | | 220/565 |
| 2014/0291221 A1* | 10/2014 | Adams | E03F 3/046 |
| | | | 210/170.03 |
| 2017/0292259 A1 | 10/2017 | Van Der Scheer et al. | |
| 2017/0292260 A1* | 10/2017 | Van Der Scheer | E02B 11/005 |

FOREIGN PATENT DOCUMENTS

| | | | |
|---|---|---|---|
| DE | 102009004915 A1 * | 7/2010 | ............. E03F 1/005 |
| EP | 0 734 478 B1 | 6/1995 | |
| EP | 0 943 737 A1 | 9/1999 | |
| EP | 1 260 640 A1 | 11/2002 | |
| EP | 1 416 099 A2 | 6/2004 | |
| EP | 1 437 305 | 7/2004 | |
| EP | 1 607 534 A1 | 12/2005 | |
| EP | 1 607 535 A1 | 12/2005 | |
| EP | 1 932 975 A | 6/2008 | |
| EP | 1 997 970 A1 | 12/2008 | |
| EP | 2 385 178 A2 | 11/2011 | |
| EP | 2 682 534 A1 | 1/2014 | |
| FR | 2 502 458 | 10/1982 | |
| GB | 2 417 733 A | 3/2006 | |
| GB | 2417733 A * | 3/2006 | ............. E03B 3/03 |
| JP | H11-222885 A | 8/1999 | |
| KR | 10-1141308 B1 | 7/2012 | |
| RU | 2373339 C2 | 11/2009 | |
| WO | WO 98/20209 A1 | 5/1998 | |
| WO | WO 2007/054130 A1 | 5/2007 | |
| WO | WO 2011/089690 A1 | 7/2011 | |

OTHER PUBLICATIONS

International Preliminary Report on Patentability for International Application No. PCT/EP2015/071462, dated Dec. 2, 2016, 6 pages.
International Search Report and Written Opinion for International Application No. PCT/EP2015/071461, dated Nov. 5, 2015, 10 pages.
International Search Report and Written Opinion for International Application No. PCT/EP2005/006118, dated Oct. 21, 2005.
European Search Report for European Application No. 04076793, dated Oct. 26, 2004.
European Search Report for European Application No. 05075605, dated Oct. 5, 2005.
European Search Report for European Application No. 07075743, dated Oct. 4, 2007.

* cited by examiner

PLASTIC INFILTRATION UNIT AND SYSTEM

RELATED APPLICATIONS

This application is a National Stage of International Application No. PCT/EP2015/071462, filed Sep. 18, 2015, which claims foreign priority benefits under 35 U.S.C. § 119(a)-(d) or 35 U.S.C. § 365(b) of Dutch application number NL 1040956, filed Sep. 19, 2014.

The present invention relates to a plastic infiltration unit, a system comprising a plurality of plastic infiltration units, a method of manufacturing an injection molded plastic pillar for an infiltration unit, a plastic base plate for use with a plastic infiltration unit, and a plastic infiltration system for deployment underground comprising a plastic infiltration unit and a plastic base plate.

Plastic infiltration units are known. Infiltration units (also known as attenuation units depending on the deployment conditions of the unit) are for the temporary storage of excess rainwater, enabling controlled discharge. They are used for managing intense rainfall run-off and for reducing the risk of flooding. When the water stored in the unit is later discharged into a water impermeable system, such as a sewer, the unit may sometimes be referred to as an attenuation unit. When the stored water is later discharged into a water permeable system, such as the ground, the unit is generally referred to as infiltration units. Where reference is made in this text to an infiltration unit, it may refer to a unit suitable for attenuation (attenuation unit) and/or infiltration (infiltration unit).

Plastic infiltration units may be stacked in a vertical array or arranged in a planar horizontal array or arranged in a 3 dimensional array. In use, the infiltration units are subject to different loads, for example, side loads and vertical loads depending on the particular arrangement of units. In conventional infiltration units, it was found that portions of the structure, in particular, side walls, were flattened by the side load to which they were subjected to. Whilst this disadvantage may be addressed by increasing the wall thickness of the infiltration units, this results in an increase in the amount of material required, an increase in the weight of the unit, an increase in cost and manufacturing time.

In EP 1 932 975 A, an infiltration body is described. The infiltration body is in the form of a table having table legs. The legs are formed as grid structures.

A disadvantage of this infiltration body is that the grid structure requires a complex manufacturing process and results in a structure which uses more material and which results in a unit having an increased weight and which requires a longer cooling time due to the increased material usage. Further, it has been found that the grid structure is not optimal for bearing compression loads, having a tendency to buckle under compression loads.

It is an object of the invention to provide a plastic infiltration unit that will address at least one of the above-mentioned problems.

In particular, it is an object of the present invention to provide a plastic infiltration unit which exhibits an improvement in its ability to withstand loads, in particular to withstand side loads and a resistance to buckling, without resulting in an increased product weight and cooling time. It is a further object is to reduce production costs, for example, by reducing the complexity of the manufacturing process.

In accordance with one aspect of the invention, there is provided a plastic infiltration unit comprising:

a top deck, at least one pillar extending from the top deck, wherein the at least one pillar includes a plurality of compartments, wherein at least one of the compartments is laterally enclosed, and wherein the top deck and the at least one pillar are produced in one piece.

In this way, a material saving is achieved. This results in a reduction in the cooling time, a cost saving, an optimal use of material and easier handling due to the lower weight of the infiltration unit. Further, the plastic infiltration unit of the present invention can be produced having an increased pillar height (in the z direction). In particular, the plastic infiltration unit produced in a single shot has an increased height that effectively load bears. This results in a reduction in production costs. The plastic infiltration unit of the present invention also exhibits an increased functionality in terms of the volume of water that can be handled and an high strength requiring less materials.

A further advantage of the present invention including at least one pillar, is that it has been found that a pillar structure has a higher compression strength and a lower tendency to buckle under compression loads.

According to a further aspect of the invention, there is provided a plurality of plastic infiltration units, arranged in use to form a stack of plastic infiltration units, wherein in the stack, the at least one pillar of the at least one plastic infiltration unit is oriented in a downward direction, and wherein the top deck of a first plastic infiltration unit forms a base plate of a second plastic infiltration unit arranged above the first plastic infiltration unit in the stack.

In this way, only one base plate per vertical stack of plastic infiltration units is required. Once a first layer of plastic infiltration units has been installed, the subsequent installation requires only that further plastic infiltration units are stacked directly on top of the existing layer. This results in a simplification in the installation process and consequently a reduction in installation costs.

According to a yet further aspect of the invention, there is provided a system comprising a plurality of plastic infiltration units according to the preceding aspects, arranged in use to form a stack extending in a vertical direction, wherein the plurality of plastic infiltration units are stacked in a vertical direction one on top of the other, the system further comprising a single base plate having at least one socket for receiving a pillar, wherein the single base plate is disposed at the base of the stack and is arranged in use to receive in the at least one socket at least one pillar of a first plastic infiltration unit, and wherein the top deck of a first infiltration unit forms a base plate for a second infiltration unit disposed above the first infiltration unit and so on.

In this way, only one base plate is required. This results in the manufacture of the system being more effective in terms of materials, since only one base plate is required. Further in a stack, the top deck of a lower plastic infiltration unit in the stack serves as the base plate for an upper plastic infiltration unit. This results in a reduction in material which results in a reduction in costs.

According to a yet further aspect of the invention, there is provided a method of manufacturing an injection molded plastic pillar for an infiltration unit, the method comprising forming a plastic pillar having a central compartment and at least one further compartment, wherein the at least one further compartment surrounds, at least in part, the central compartment, wherein the at least one further compartment extends in a same longitudinal direction as the central compartment, the method further comprising: injecting plastic into a mold for the pillar, the mold comprising a core for the central compartment and a core for the at least one further compartment, withdrawing the core for the at least one further compartment in one direction, withdrawing the core for the central compartment in a direction different from the one direction.

By withdrawing the core for the at least one further compartment in one direction and withdrawing the core for the central compartment in a direction different from the one direction, the draft angle of the at least one further compartment is in the one direction and the draft angle for the central compartment is in the different direction. This has a consequence that the draft angles do not cause extra wall thickness because the cores have parallel planes. Further, the draft angle of the central core can tend to zero if the surrounding cores are made with a larger draft angle on the outside. By providing a central core having a minimum draft angle, force from one unit to another unit in a stack of units can be conducted more directly.

According to a yet further aspect of the invention, there is provided a plastic base plate for use with a plastic infiltration unit, the plastic base plate comprising: at least one receiving portion for receiving at least one pillar of a plastic infiltration unit at a receiving location, the receiving portion comprising a socket and a shoulder portion disposed at a region surrounding at least a part of the socket, wherein the shoulder portion is formed so that the thickness (height) of the plastic base plate is increased in the region surrounding at least a part of the socket, so that bending load on the base plate is at least partly taken by the pillar of the plastic infiltration unit when it is located at the receiving location.

In this way, the overall thickness of the base plate (also referred to in the art as a "bottom plate") can be reduced resulting in an overall lighter base plate. Materials required for the base plate are less.

According to a further aspect of the invention, there is provided a plastic infiltration system for deployment underground comprising a plastic infiltration unit according to claim 1 and a plastic base plate according to claim 41, wherein the at least one pillar of the plastic infiltration unit is received at the receiving location of the plastic base plate.

The invention, and various embodiments thereof, will further be explained on the basis of examples, with reference made to the drawings, in which.

Figure 5:
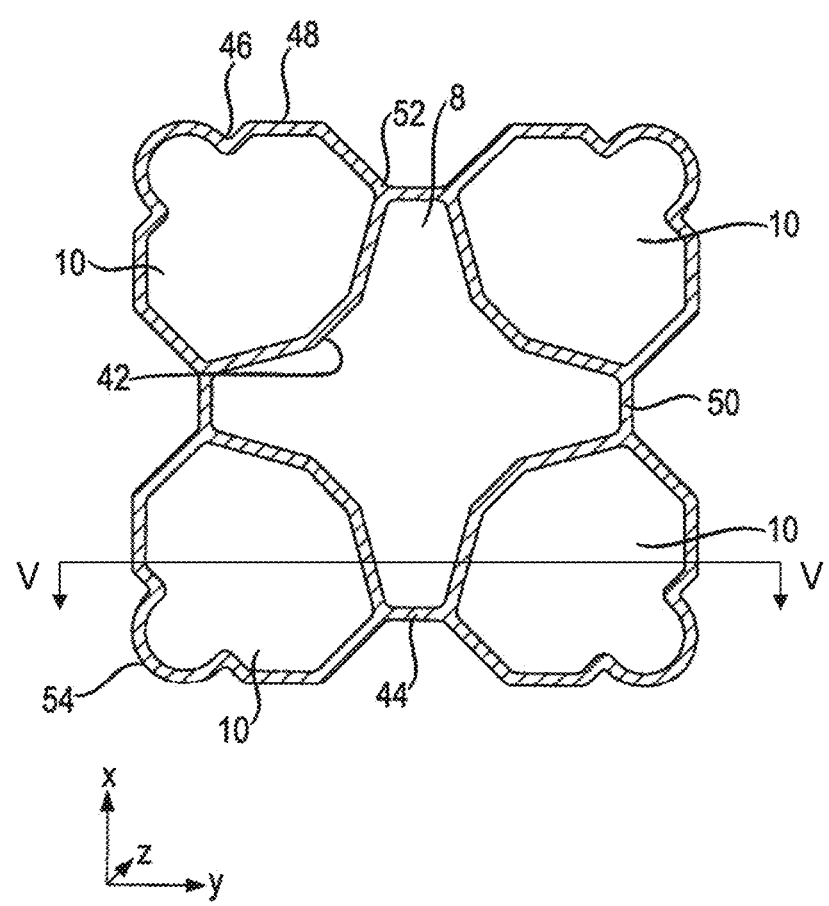
FIG. 5 shows a cross-section of a pillar of a plastic infiltration unit according to an embodiment of the invention.
Figure 5A:
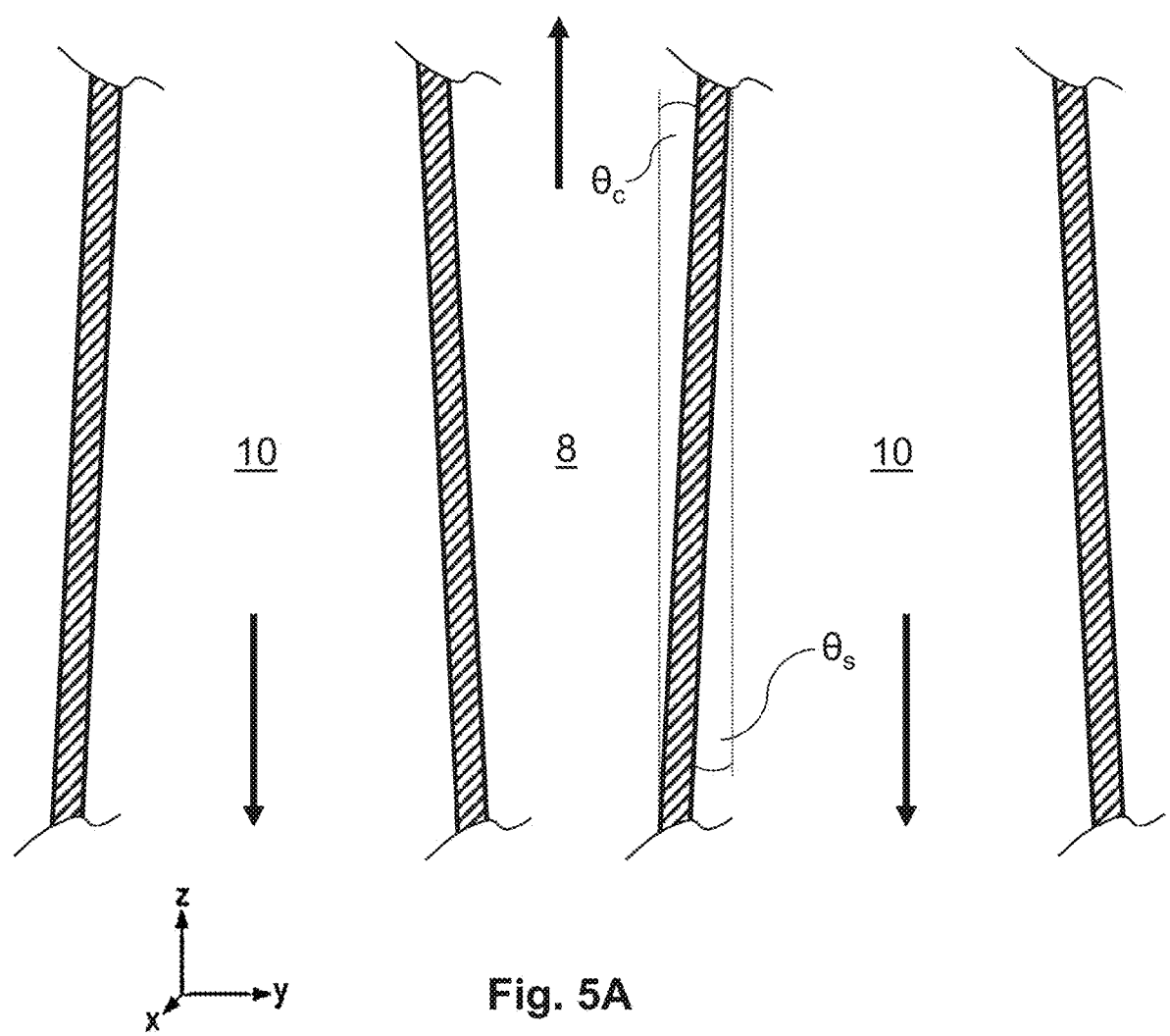
Figure 6:
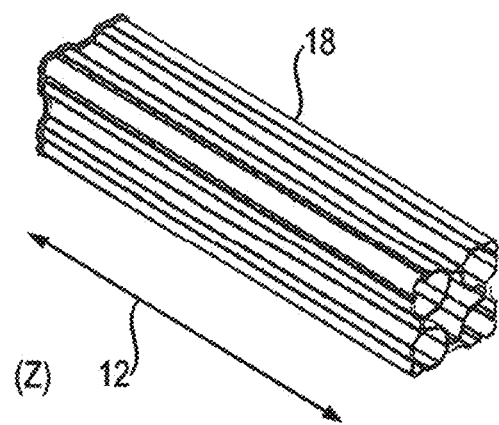
Figure 7:
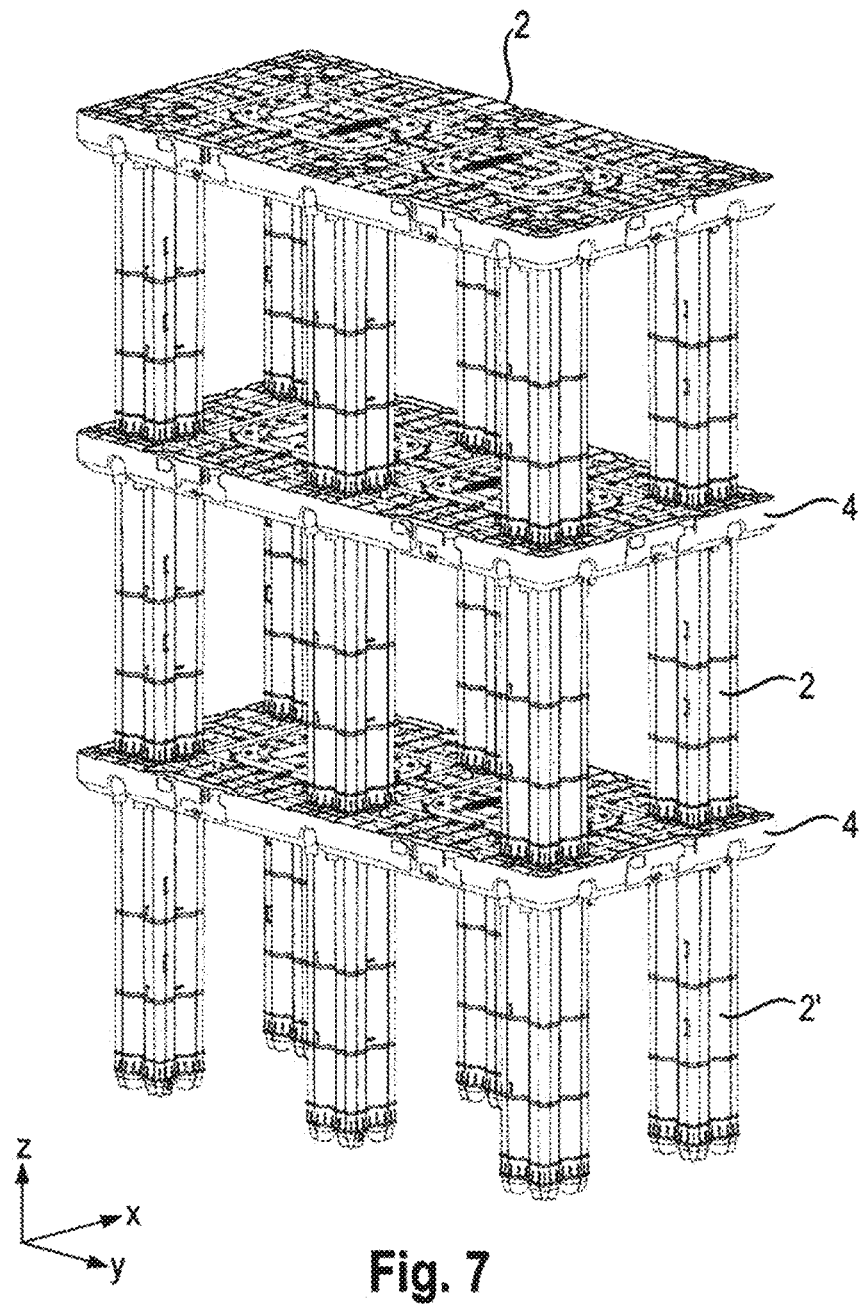
Figure 8:
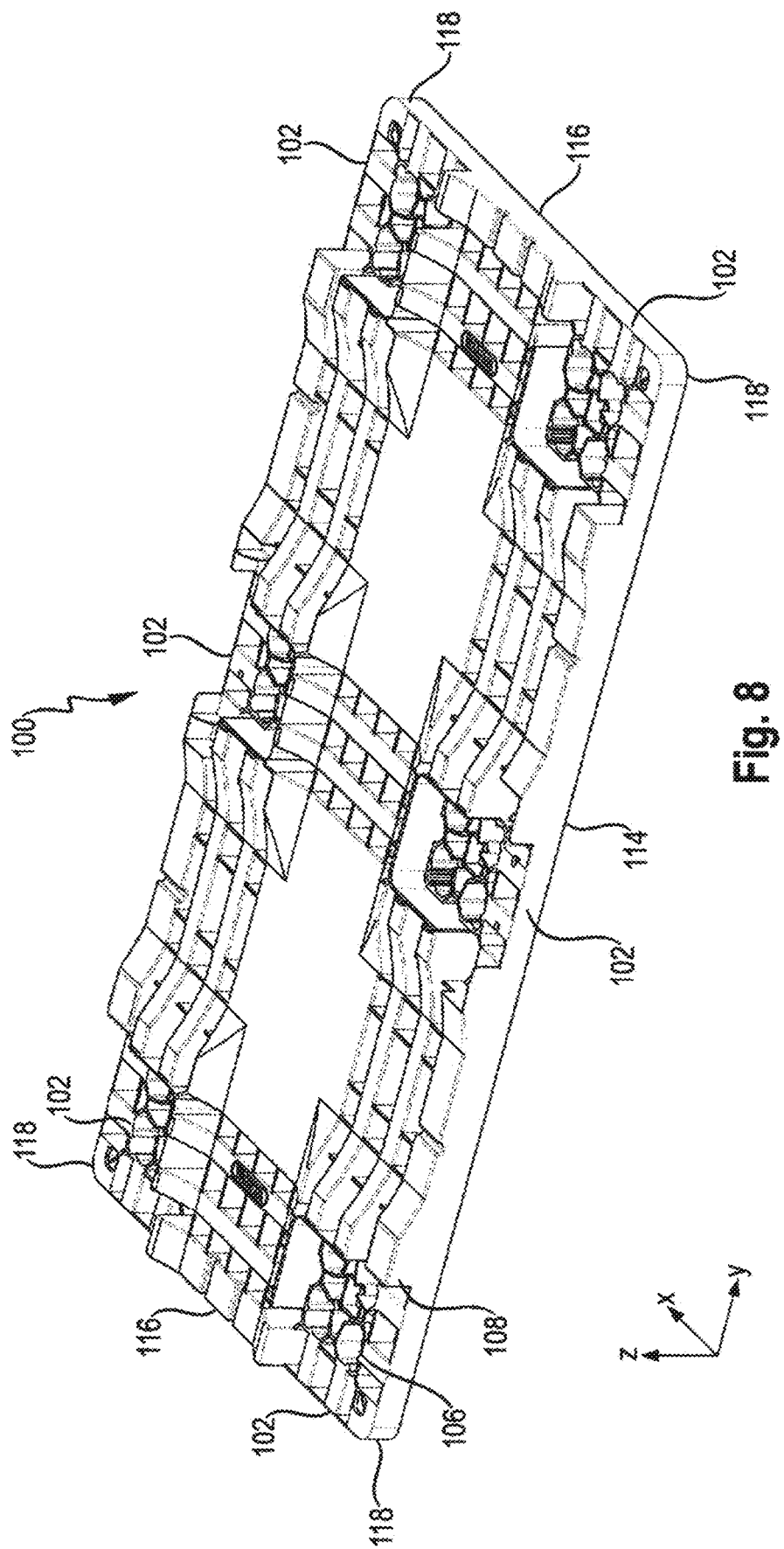
Figure 9:
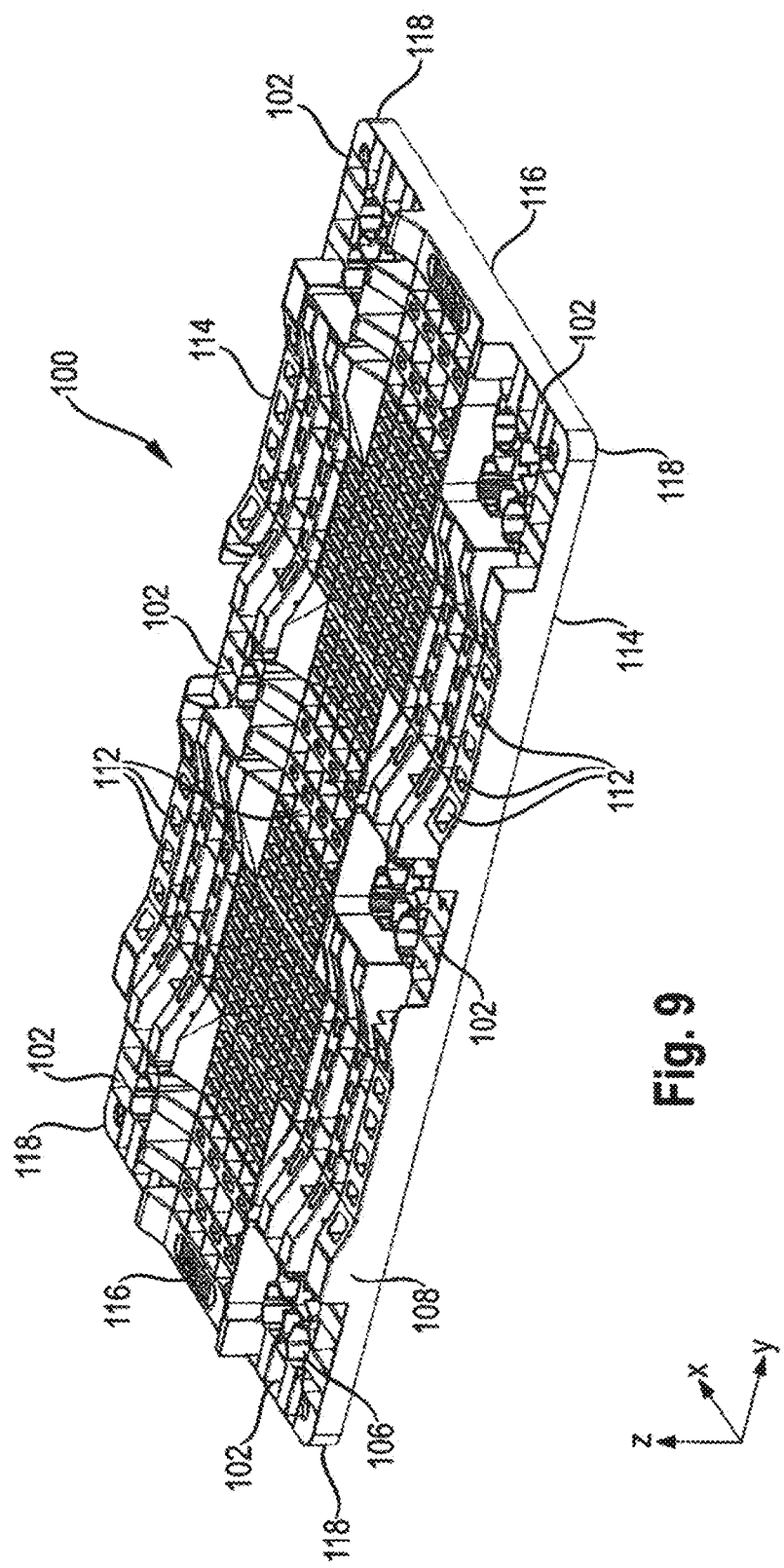
Figure 10:
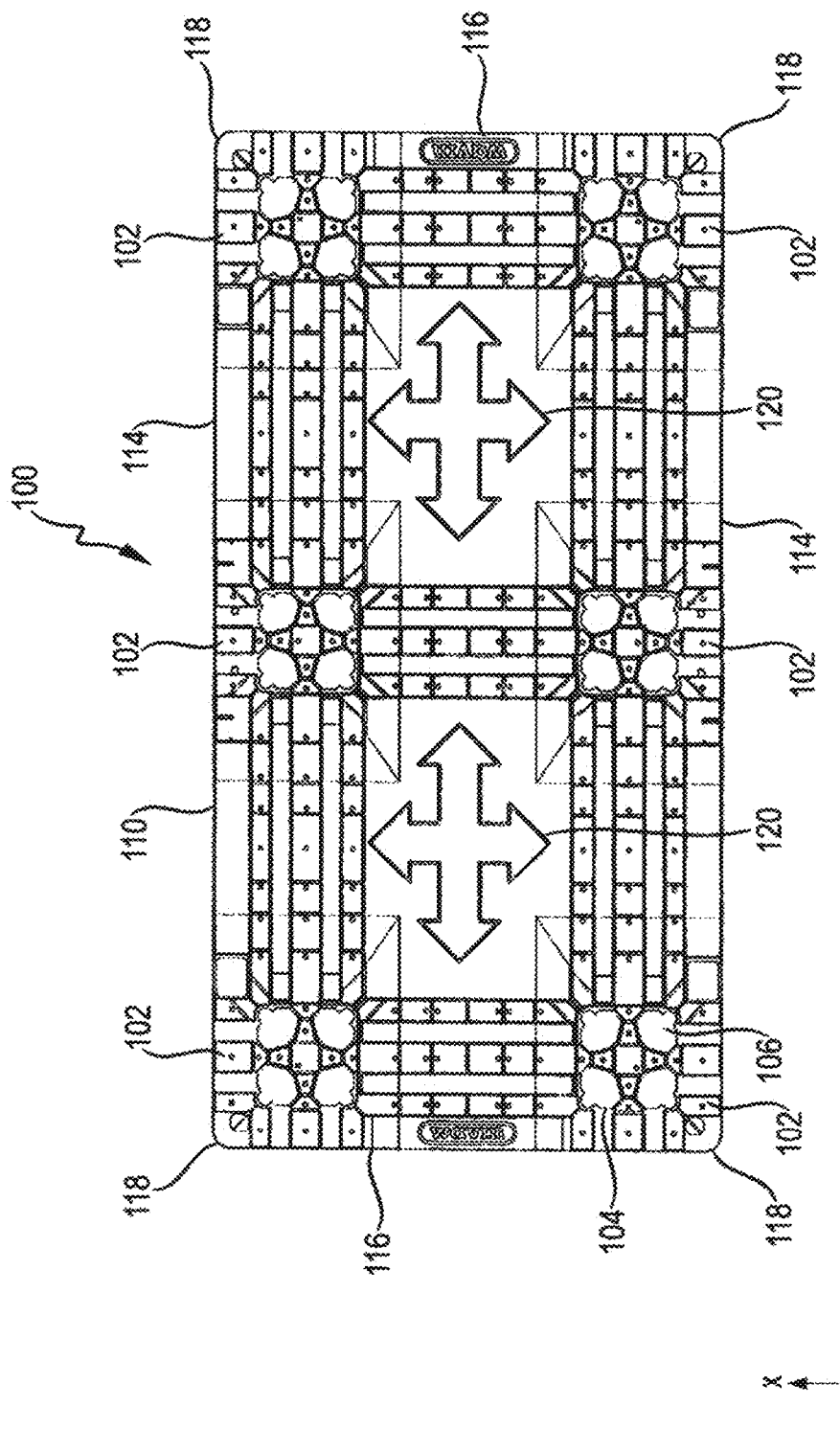
Figure 11:
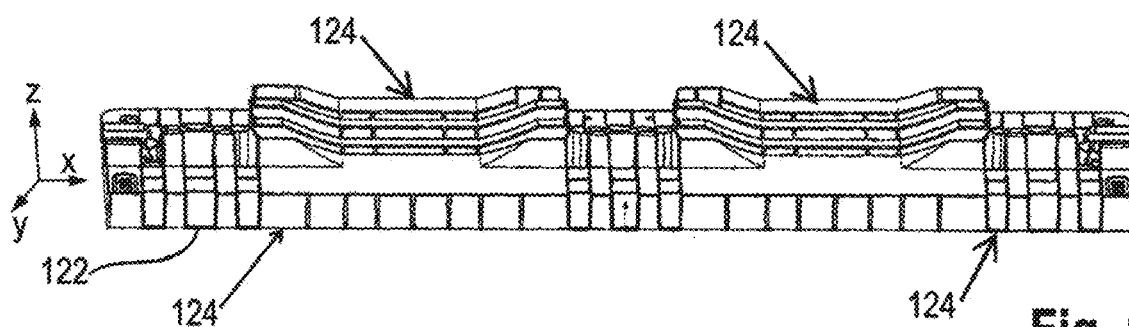
Figure 12A:
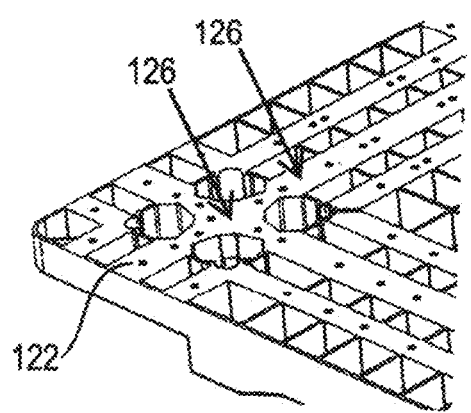
Figure 12B:
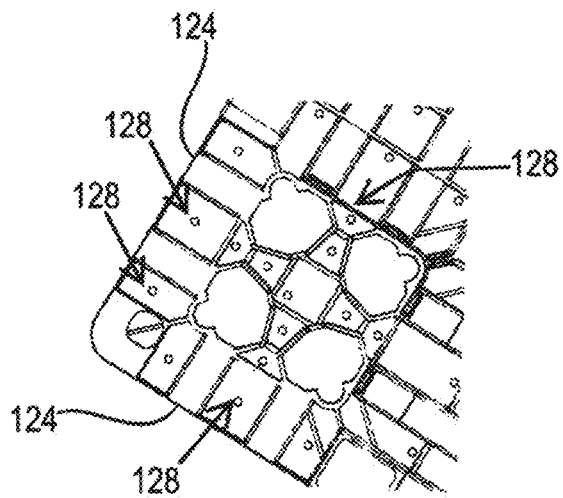
Figure 13:
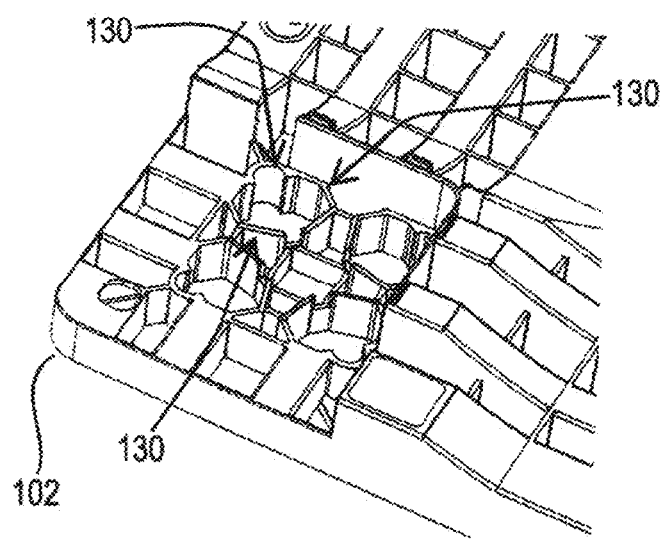
Figure 14:
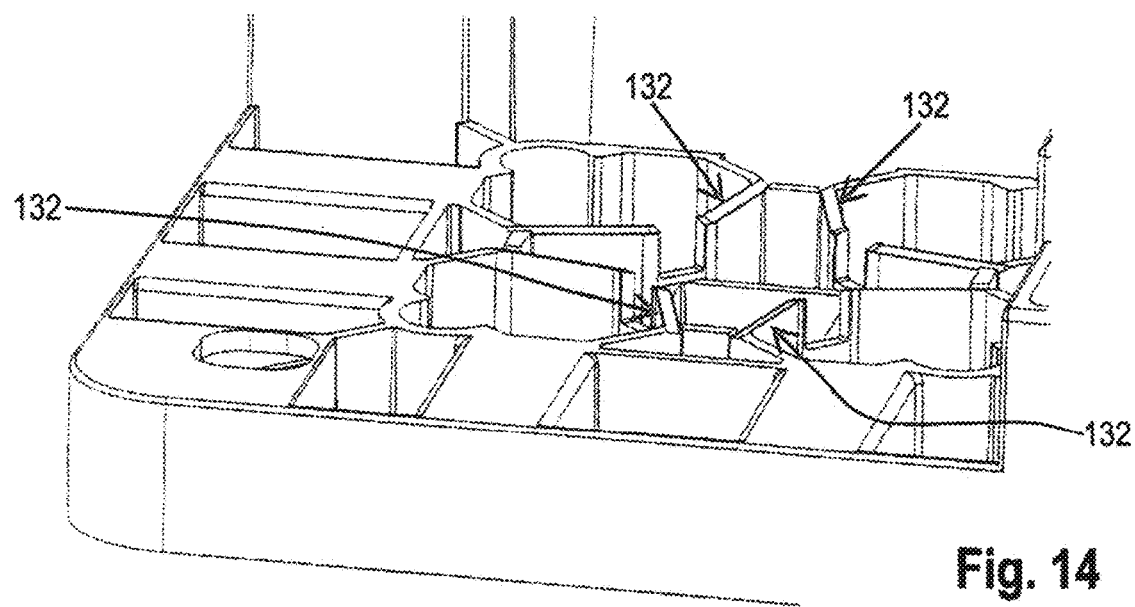
Figure 15:
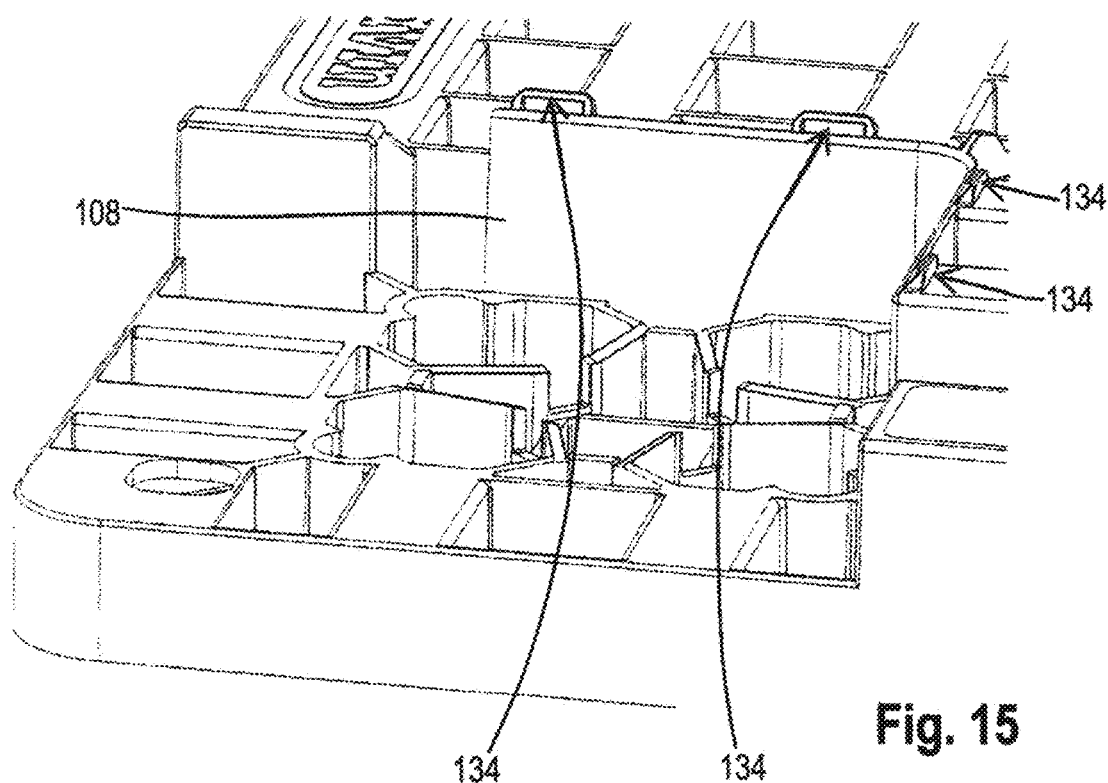
Figure 16:
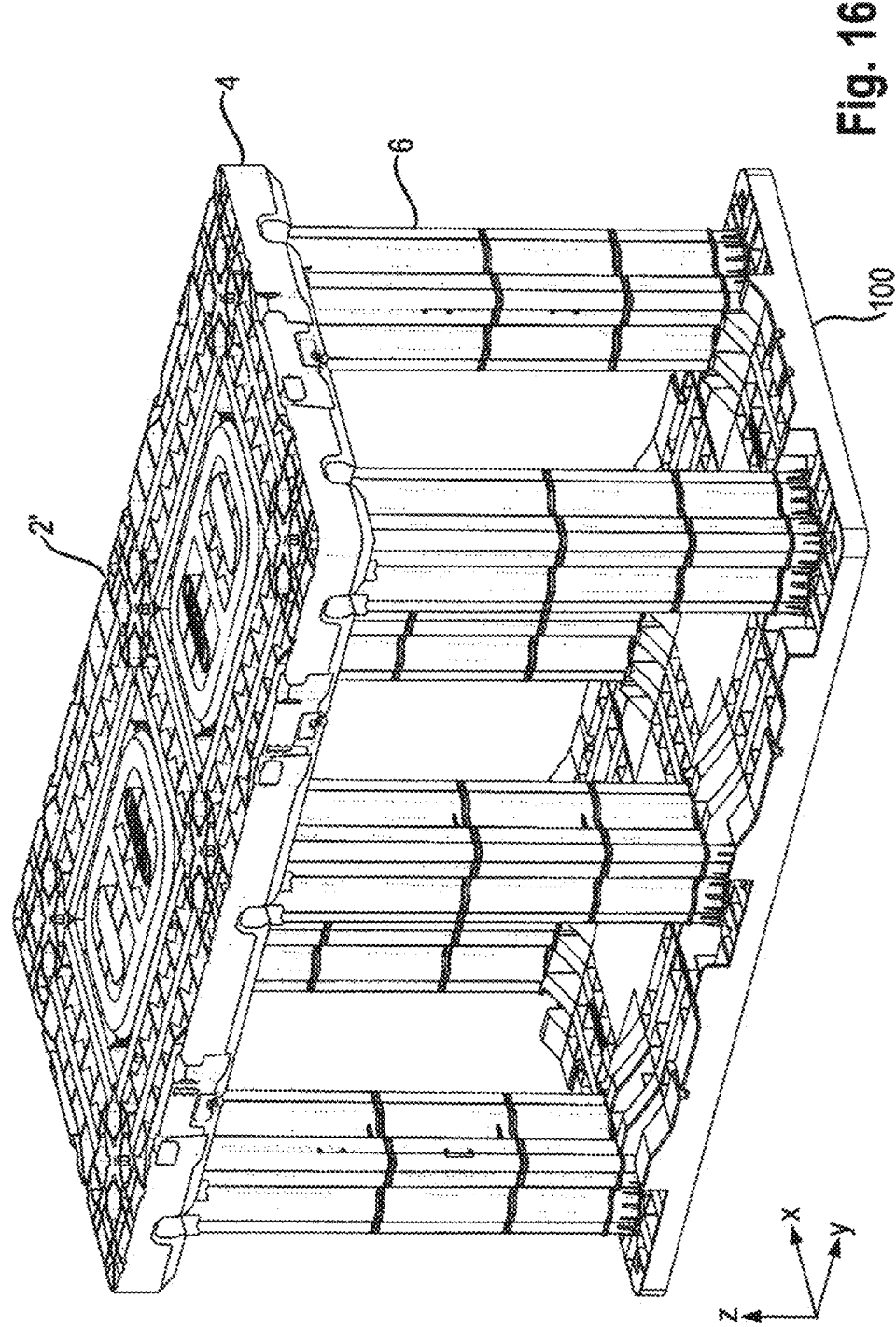
Figure 17A:
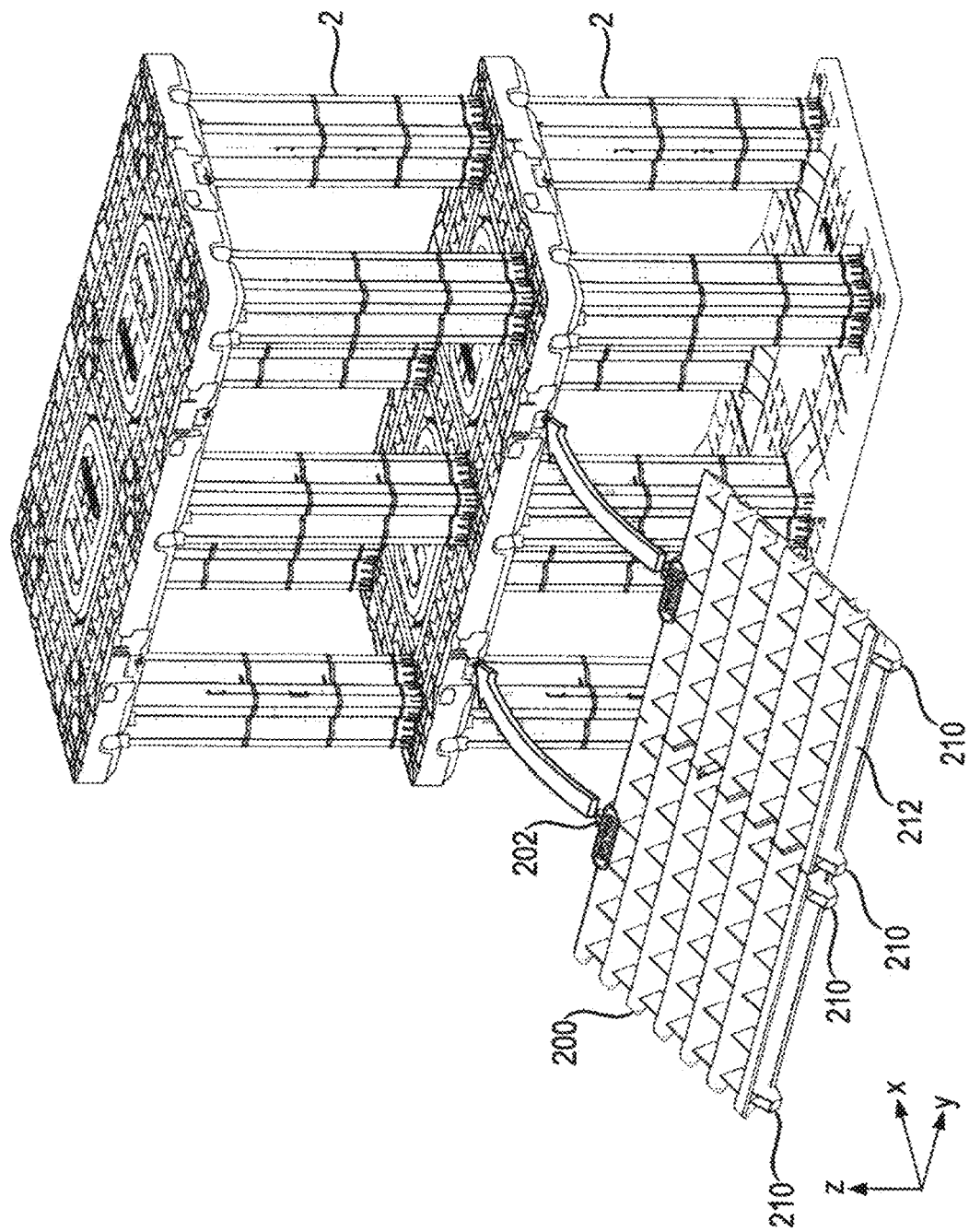
Figure 17B:
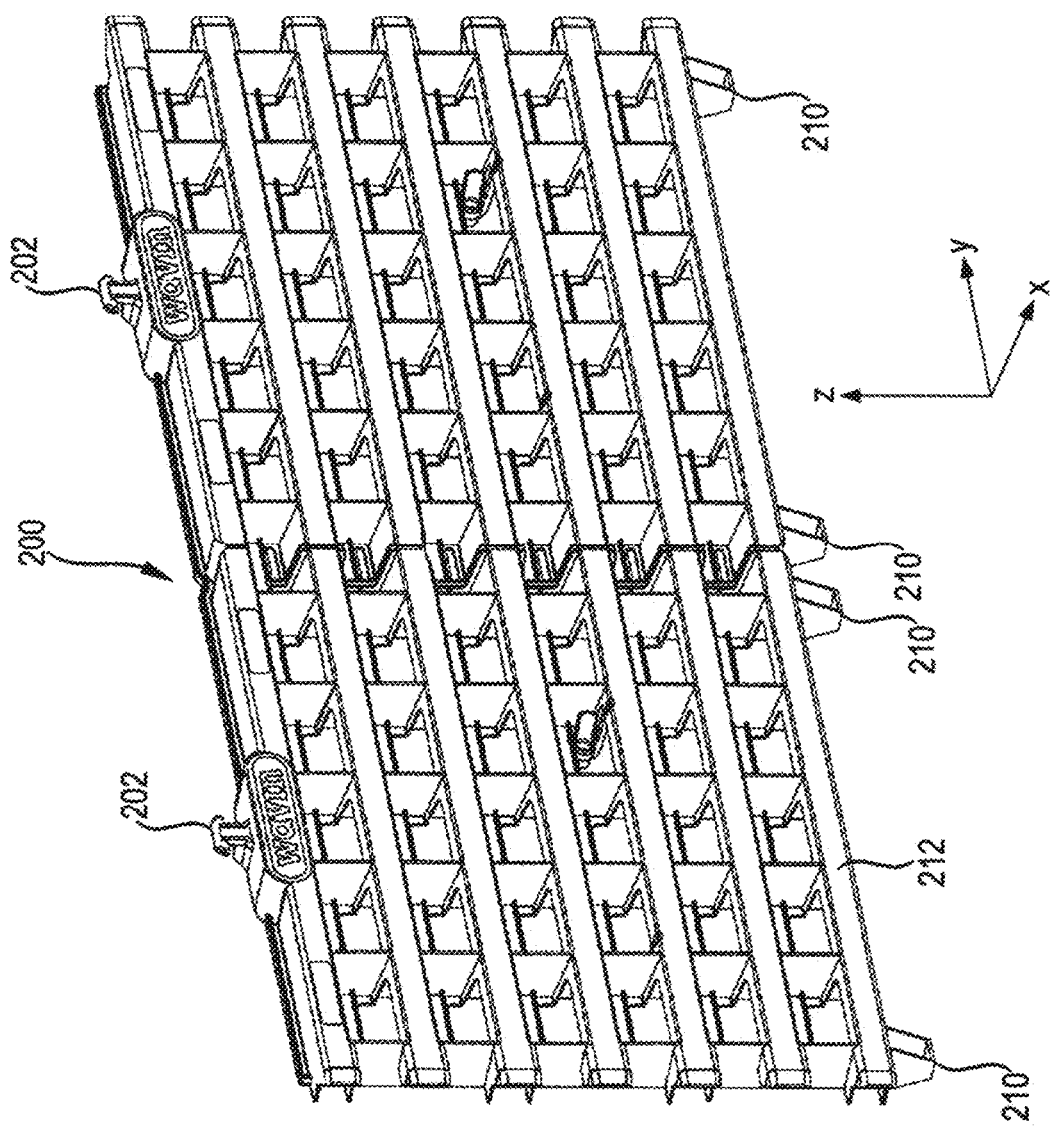
Figure 17C:
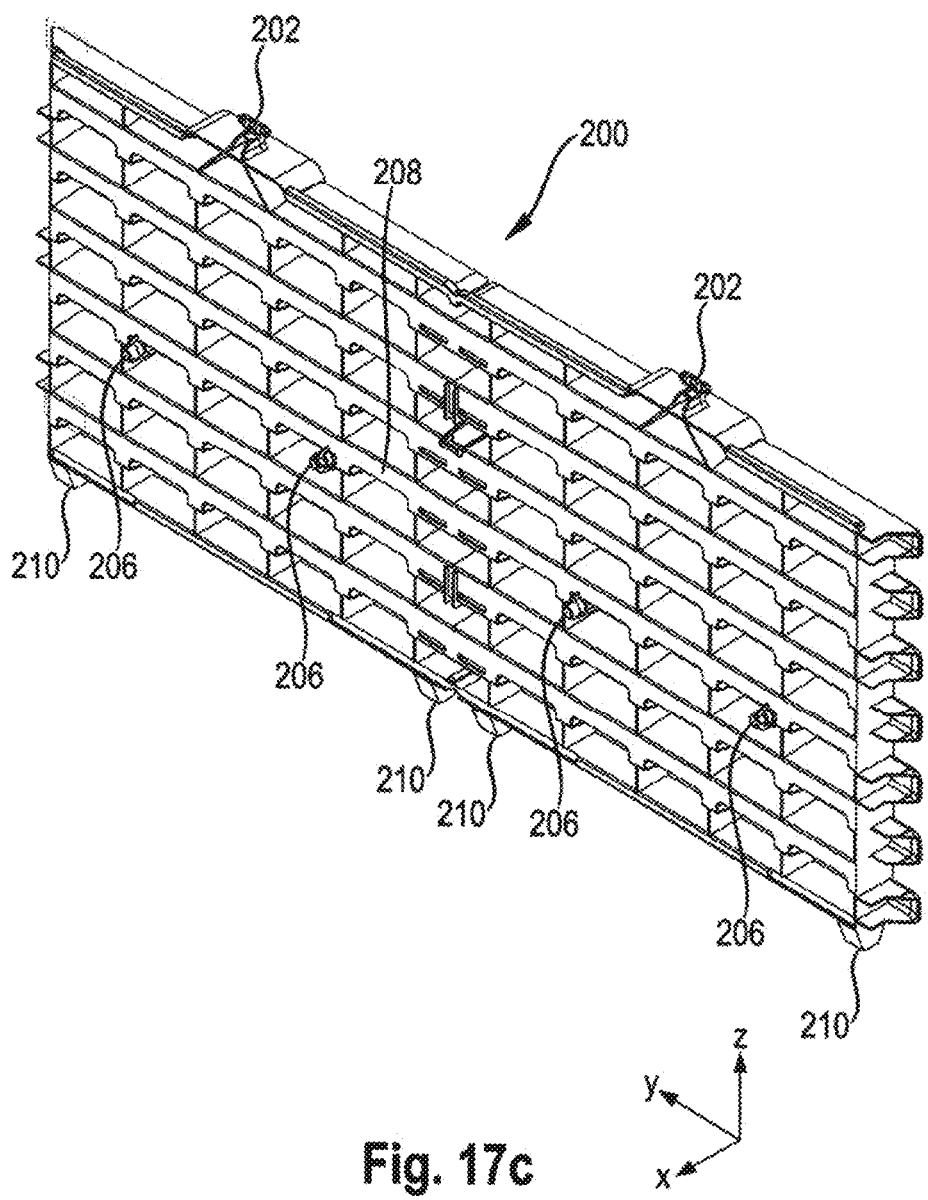
Figure 17D:
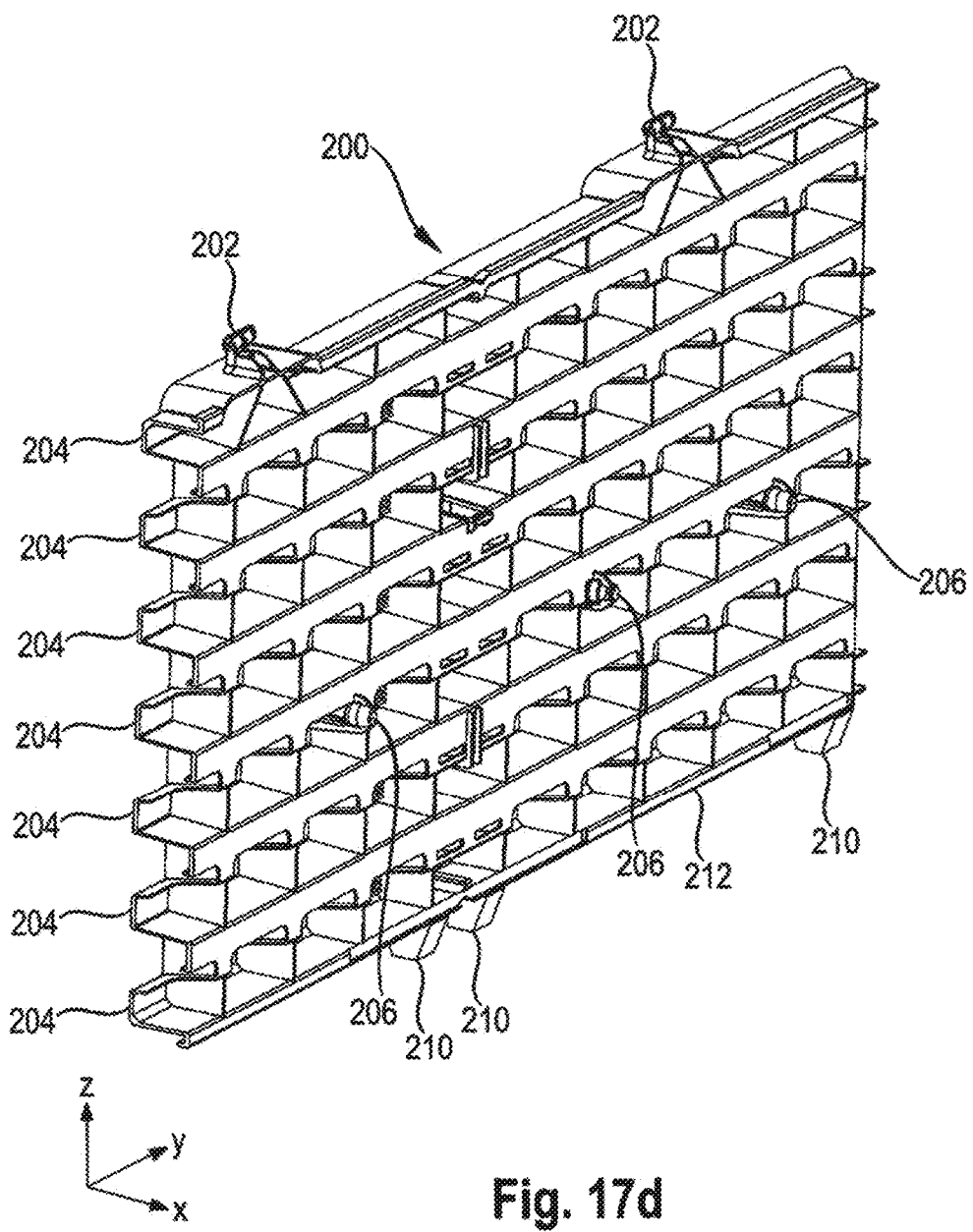
Figure 18:
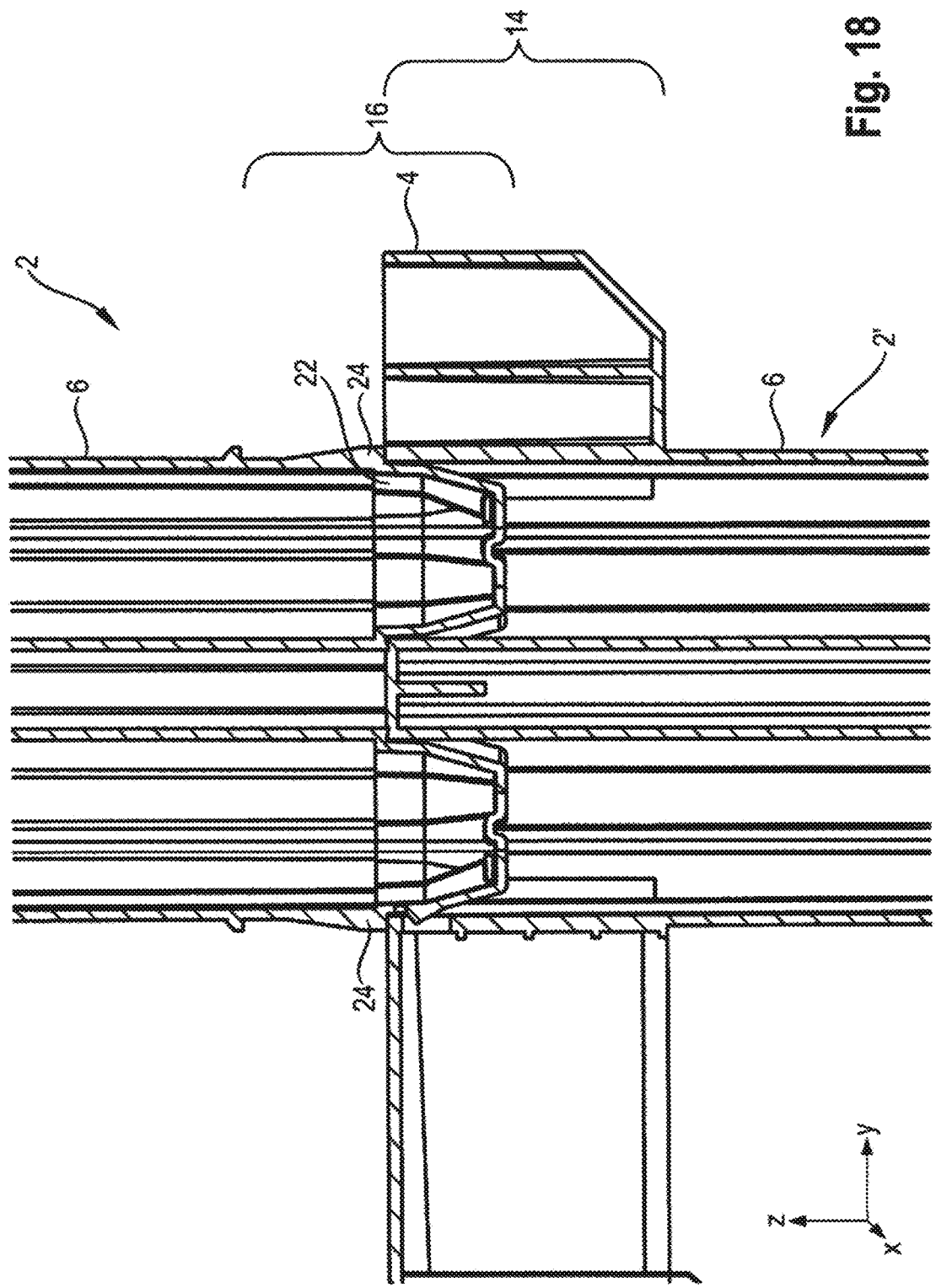

FIG. 5A a cross-section taken along the line V-V in FIG. 5;

FIG. 6 shows a view of a portion of a pillar of a plastic infiltration unit according to an embodiment of the invention;

FIG. 7 shows a plurality of plastic infiltration units in a stacked arrangement according to an embodiment of the invention;

FIG. 8 shows a view of a plastic base plate for use with a plastic infiltration unit according to an embodiment of the invention;

FIG. 9 shows a view of a plastic base plate for use with a plastic infiltration unit according to an embodiment of the invention;

FIG. 10 shows a top view (bird's eye view) of a plastic base plate according to an embodiment of the invention;

FIG. 11 shows a detail of receiving portion in cross section of the plastic base plate according to an embodiment of the invention;

FIGS. 12*a* and 12*b* show details of an underside view of a plastic base plate according to an embodiment of the invention;

FIGS. 13 to 15 show details of a upper view of an upper surface of a plastic base plate according to embodiments of the invention;

FIG. 16 shows a plastic infiltration system according to an embodiment of the invention comprising a plastic infiltration unit and a plastic base plate;

FIGS. 17 *a*, *b*, *c* and *d* show a plastic infiltration unit side plate according to an aspect of the present invention; and FIG. 18 shows details of a cross section in the z-y plane of a pillar inserted into a top deck according to embodiments of the present invention.

In the drawings and in the detailed description hereinbelow, like reference signs denote like features. The invention is exemplified in the embodiments described below. The invention is not limited to these embodiments, which are schematically shown.

Figure 1:
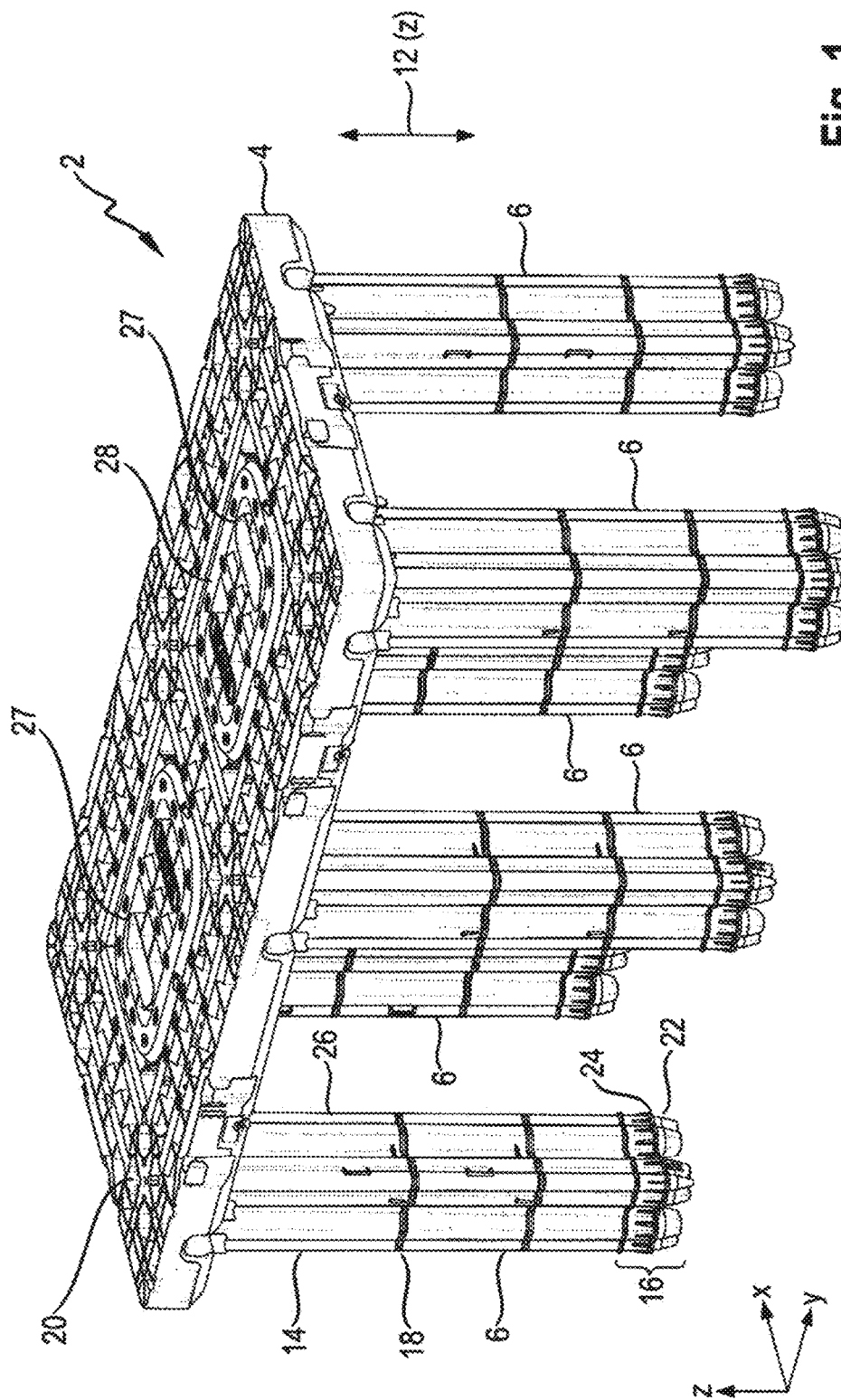
FIG. 1 shows a plastic infiltration unit according to an embodiment of the invention.
Figure 2:
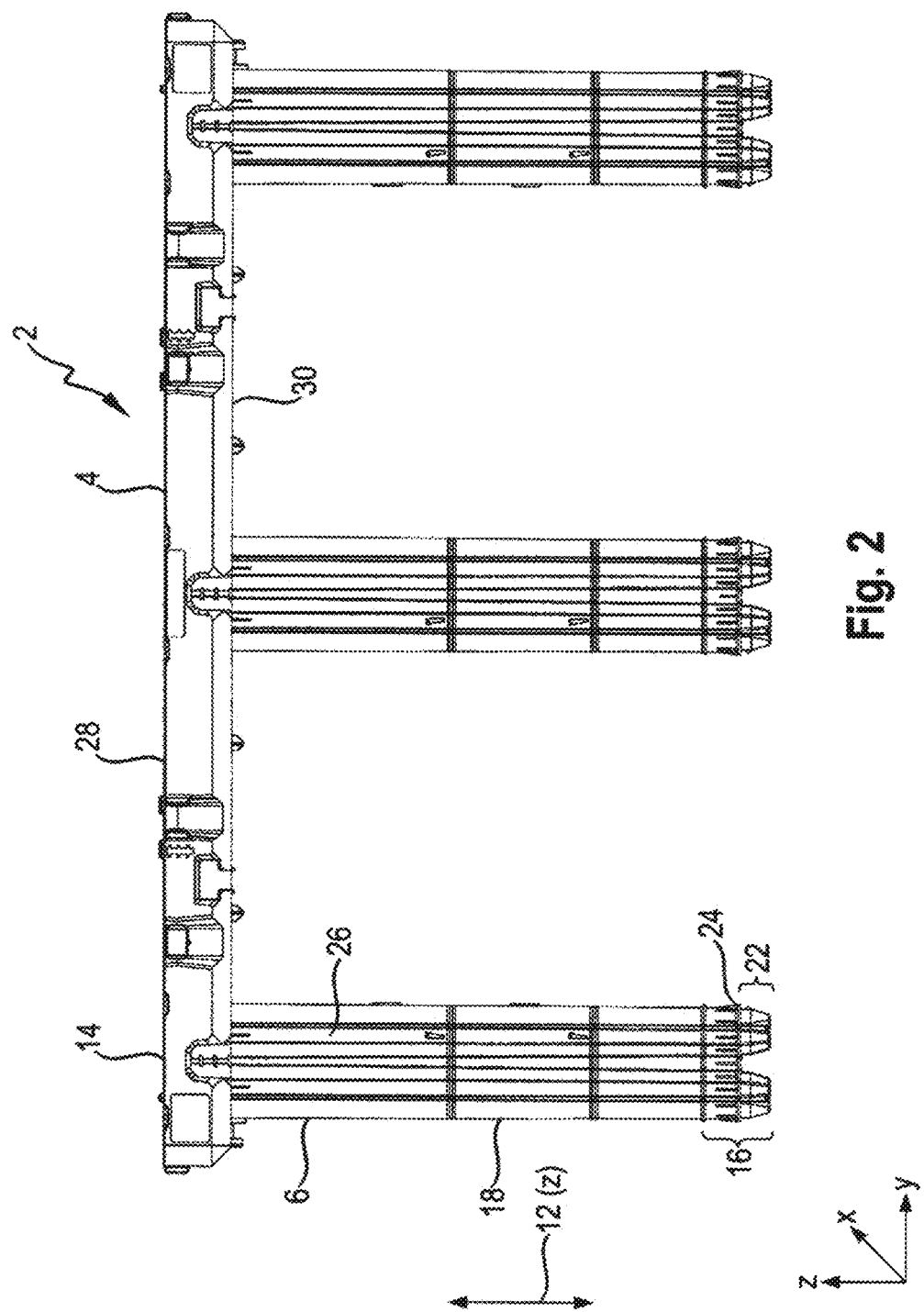
FIG. 2 shows a side view of a plastic infiltration unit according to an embodiment of the invention.
Figure 3:
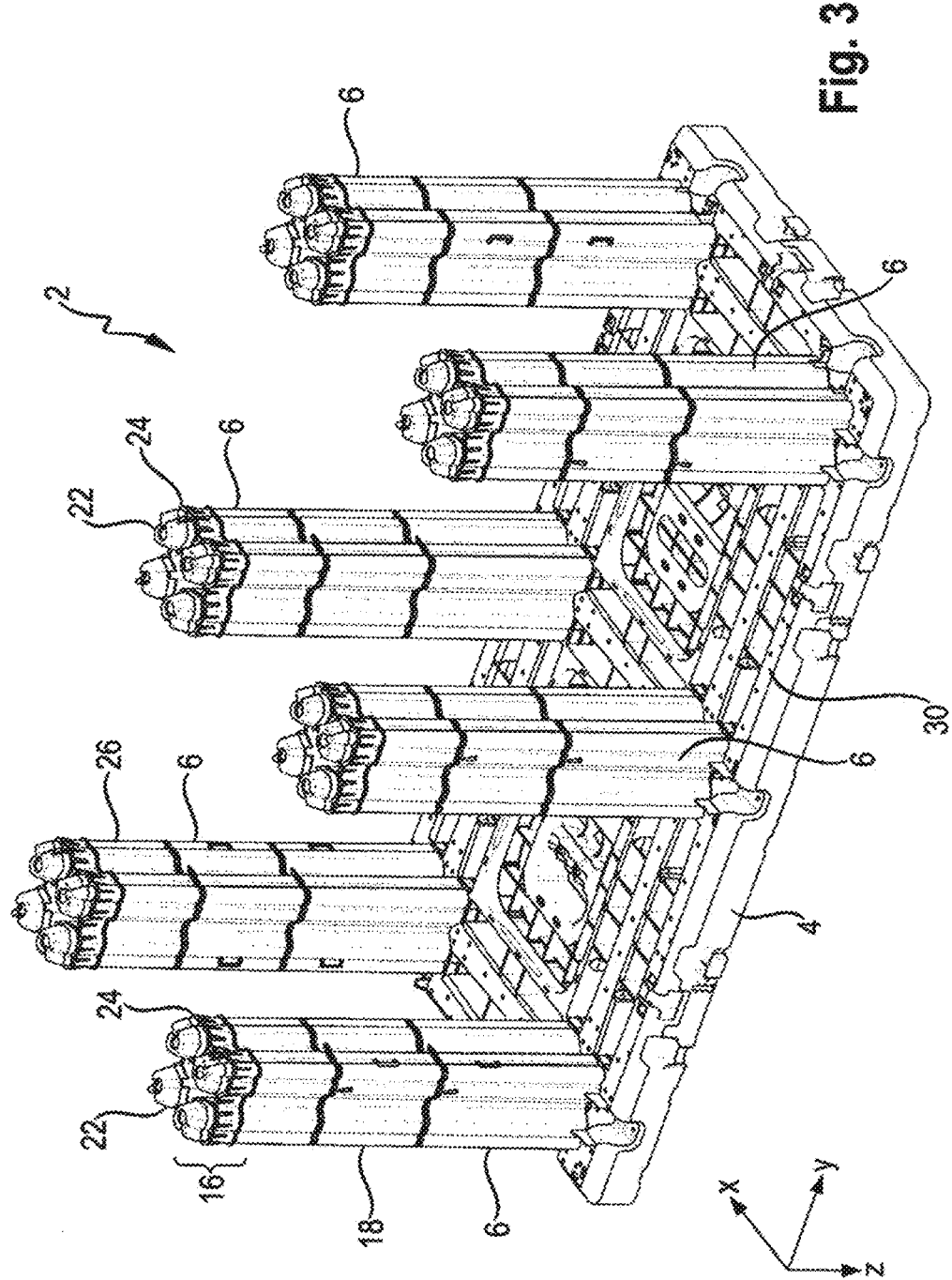
FIG. 3 shows an underside view of a plastic infiltration unit according to an embodiment of the invention.
Figure 4:
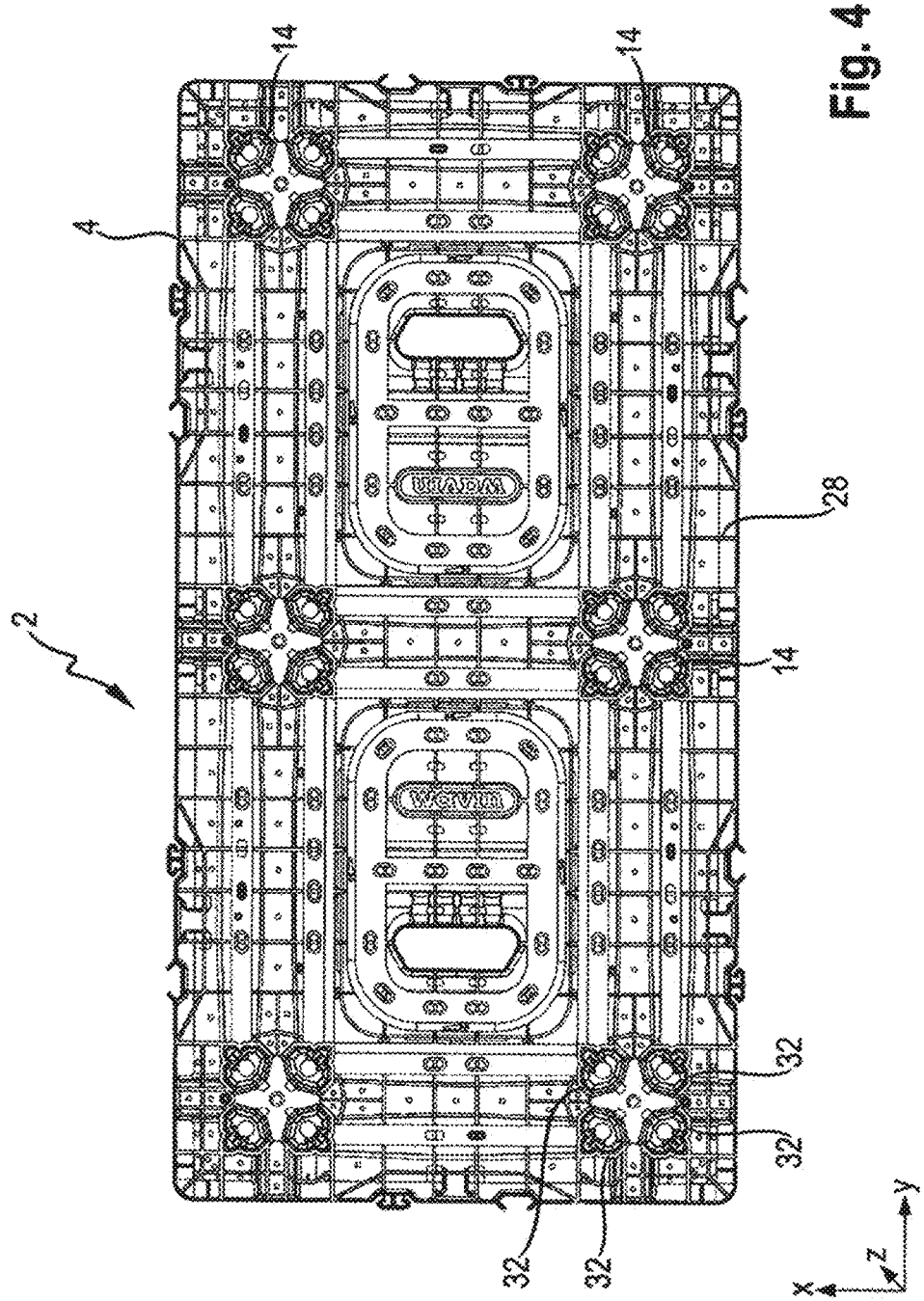
FIG. 4 shows a top view (bird's eye view) of a plastic infiltration unit according to an embodiment of the invention.

FIG. 1 shows a plastic infiltration unit according to an embodiment of the invention. The plastic infiltration of the present invention may be arranged with one or more other plastic infiltration units to form an assembly. FIG. 2 shows a side view of the plastic infiltration unit of FIG. 1. FIG. 3 shows an underside view of the plastic infiltration unit of FIG. 1. FIG. 4 shows a top view (bird's eye view) of a plastic infiltration unit of FIG. 1. In particular, FIG. 4 shows an upper surface of the plastic infiltration unit. According to an embodiment of the invention, the plastic infiltration unit 2 comprises a top deck 4 and at least one pillar 6 extending from the top deck 4. The at least one pillar 6 includes a plurality of compartments 8, 10 (FIG. 5). The plastic infiltration unit 2 may be weld free. For example, it is preferably made by injection molding from thermoplastic material. The plastic infiltration unit 2 according to the invention can be produced in a single shot. In this way, an efficient manufacturing process is achieved. At least one of the compartments 10 is laterally enclosed, that is, at least one of the compartments is enclosed around its perimeter. In other words, at least one of the compartments is not open from a sideways direction. In this way, the plastic infiltration unit is able to withstand a sideload effectively. Further, the top deck 4 and the at least one pillar 6 are produced in one piece. In this way, an efficient manufacturing process is achieved.

In the embodiment shown in FIG. 1, the unit 1 includes six pillars. Other numbers of pillars are envisaged, for example, two, three or four, or more.

The at least one pillar 6 extends from the top deck 4 in a longitudinal direction 12 (FIGS. 1, 2 and 6). The plurality of compartments 8, 10 extend along the longitudinal axis 12 (also indicated as the direction of the z (vertical) axis) through the length of the pillar 6. The at least one pillar has a proximal end 14 and a distal end 16 with respect to the top deck 4. The pillar 6 further comprises an intermediate portion 18 located between the proximal end 14 and the distal end 16.

The at least one pillar 6 extends from the top deck 4. The at least one pillar 6 is arranged away from the edge of the underside of the top deck 4 so as to allow one or more side panels to be attached to the outer side or sides of the plastic infiltration unit. In the case where a plurality of pillars 6 are provided, the pillars are disposed with respect to one another so that access to the inside of the plastic infiltration unit is provided, for example, by an inspection apparatus. A function of the at least one pillar is to transfer load. A further function of the pillars with regard to their position on the underside of the top deck 4 is to transfer load whilst providing access to, for example, inspection apparatus. As mentioned above, in the embodiment shown in the figures, six pillars are provided so that a pillar is provided in the vicinity of each corner of the top deck 4 and a pillar is provided along the long side of the top deck 4 (along the y direction) in the vicinity of half way along the long side in the y direction. As mentioned above, the pillars are positioned along edge in such a manner that one or more side panels may be attached to the plastic infiltration unit.

The proximal end 14 of the at least one pillar 6 may comprise a socket 20 and the distal end 16 may comprise a foot 22 and a rim 24 disposed adjacent to the foot 22 and extending around the pillar 6 (FIGS. 1 and 18). The distal end 16 is configured so that in use, it may be inserted into a socket of a lower unit 2. FIG. 7 shows a stack of such an arranged plurality of plastic infiltration units and is described in more detail hereinbelow. Further, FIG. 18 shows details of a cross section in the z-y plane of a pillar 6 inserted into a top deck 4 of a lower (second) plastic infiltration unit according to embodiments of the present invention.

In one embodiment, the at least one pillar 6 includes a side wall which defines an outerfacing surface of the plurality of compartments. In this way, by virtue of the arrangement of the plurality of compartments 8, 10 (described hereinbelow with reference to FIGS. 5 and 6) the pillar 6 is able to withstand a side load more effectively.

In the embodiment shown, the top deck 4 extends in a plane, for example, the xy plane shown in FIG. 1. The longitudinal direction 12 (or z direction) of the at least one pillar 6 is substantially perpendicular to the plane of the deck (the xy plane shown in FIG. 1).

The deck of a (first) infiltration unit provides a structure into which pillars of the (first) plastic infiltration unit extend from and into which pillars of another (second) plastic infiltration unit are insertable into. The pillars are provided to support a load. The load includes a load from surrounding plastic infiltration units and the load of any water. The load is transferred via the pillars also through the deck (FIG. 18). In this specification, the deck of a plastic infiltration unit is referred to as a "top" deck. It is referred to as a top deck since the pillars of the same plastic infiltration unit extend from an underside of the deck. Therefore, when the plastic infiltration unit is deployed the deck is on the top of the pillars. The top deck of a first plastic infiltration unit, when deployed, however, may form the base for a second plastic infiltration unit disposed on top of (stacked on) the first plastic infiltration unit.

In this disclosure reference is made to a plastic infiltration unit 2, also referred to as a (first) plastic infiltration unit 2. Reference is also made to another plastic infiltration unit 2, also referred to as a (second) plastic infiltration unit 2. Yet further plastic infiltration units, for example, third to nth plastic infiltration units may also be referred to. According to embodiments of the invention, these plastic infiltration units (first to nth) may be connected and arranged in various ways, for example, in layers and/or stacked or temporarily coupled to one another for storage and/or transportational reasons. In embodiments, the plastic infiltration units are constructed in the same way, so that, the first to nth plastic infiltration units 2 are the same, that is identical.

In this disclosure, reference is further made to upper and lower surfaces, and undersides etc of the plastic infiltration unit. As mentioned above, reference is also made to a top deck. In this connection, this terminology refers to the general, relative orientation of the various features of the plastic infiltration unit when deployed.

Further, the top deck 4 may include an upper facing surface (shown in FIGS. 1 and 2) and a lower facing surface 30 (shown in FIGS. 2 and 3). At least a part of the at least one pillar 6 extends from the lower facing surface 30, and is arranged to be interconnectable with an upper facing surface of a second infiltration unit 2' to form a stack of infiltration units 2, as shown in FIG. 7.

The top deck 4 may also include integrated hand grips 27 (FIG. 1) to enable an operator to grasp and handle the plastic infiltration unit easily. This allows the plastic infiltration units to be assembled easily and efficiently. The top deck 4 may also include areas that can be cut out, for example, for vertical inspection, i.e., so that inspection apparatus can be inserted into the plastic infiltration unit in the longitudinal (vertical) (z direction). This enables the plastic infiltration unit to be readily inspected.

Further, with regard to the internal structure of the at least one pillar (described in more detail with respect to FIGS. 5 and 6), the at least one pillar 6 extends in the longitudinal direction 12, z and has a longitudinal axis (z axis). The at least one pillar may include a central compartment 8 extending along the longitudinal axis (z axis) and at least one additional compartment 10 extending in the longitudinal direction.

In one embodiment, the pillar 6 is integratably formed in the top deck 4 so that an upper end 14 (also referred herein as the proximal end) of the pillar 6 forms a part of the top deck 4 into which a lower end 16 (also referred herein as the distal end) of a second pillar is insertable.

In one embodiment as described in more detail with regard to FIGS. 5 and 6, the pillar may include a central compartment 8 surrounded by further compartments 10. In this embodiment, the central compartment 8 is formed so that a vertical force exerted on a first pillar 6 in a first plastic infiltration unit 2 (see FIGS. 7 and 18) is conducted directly to a second pillar in a second plastic infiltration unit 2' (see FIG. 7) when the first plastic infiltration unit 2 is stacked on the second plastic infiltration unit 2' by inserting a distal end 16 of the first pillar into a proximal end 14 of the second pillar. With reference, in particular to FIG. 18, the foot 20 of the first plastic infiltration unit 2 is inserted into the top deck 4 of the second plastic infiltration unit 2'. In one embodiment, a click fit is achieved between the foot 22 of the first plastic infiltration unit 2 and the second plastic infiltration unit 2', in particular with the proximal end 14 of the second pillar 6. When inserted, the rim 24 of the pillar 6 is in contact with the top deck 4 of the second plastic infiltration unit 2', in particular, with the upper facing surface of the top deck from which the pillar of the second plastic infiltration unit 2' extends.

In this embodiment (for example, as shown in FIGS. 7 and 18), the upper pillar has a contact area for contact with a lower pillar and the lower pillar has a contact area for contact with the contact area of the upper pillar, wherein the contact area of the upper pillar overlaps with the contact area of the lower pillar, so that a vertical force exerted on the upper pillar is conducted directly to the lower pillar. In one particular embodiment, the contact area is defined by the rim 24 on the distal end of the upper pillar. When the foot 22 of the upper pillar is inserted into the socket 20 of the lower pillar, the rim 24 of the upper pillar makes contact with a portion 32 (see FIG. 4 in combination with FIG. 18) of the upper facing surface 28 of the lower pillar in the top deck 4. In one embodiment, the portion 32 corresponds to the rim 24. In this way, a direct transfer of load from one infiltration unit 2 to a lower infiltration unit 2' (see FIGS. 7 and 18) is achieved.

In one embodiment, the at least one pillar 6 may have a substantially quadrilateral cross section. In particular, the at least one pillar 6 may have a substantially square cross section. In one embodiment, the cross section of the pillar is constant or substantially constant along its length in the longitudinal (z) direction) at least up to a foot of the pillar 6.

In one embodiment, at least one wall of the central compartment 8 is provided with at least one hole (or perforation) for allowing liquids to drain from the plastic infiltration unit when the plastic infiltration unit is in storage.

FIG. 5 shows a cross-section of a pillar of a plastic infiltration unit according to an embodiment of the invention, in particular, the embodiments shown in FIGS. 1-4 and 7. FIG. 6 shows a view of a portion, in particular, the intermediate portion 18, of a pillar of a plastic infiltration unit according to an embodiment of the invention, in particular, the embodiment shown in FIGS. 1-4 and 7.

In one embodiment, as can be readily seen in FIGS. 5 and 6, the plurality of compartments 8, 10 may be hollow columns extending in a longitudinal direction, and arranged with respect to one another to form the pillar 6. As mentioned above, the at least one pillar 6 may extend from the top deck 4 in the longitudinal direction 12 (z axis) and the plurality of compartments 8, 10 extend along the longitudinal axis 12 (z axis) through the length of the pillar 6.

Preferably, the at least one pillar 6 has an internal structure comprising a central compartment 8 surrounded, at least in part, by at least one surrounding compartment 10. In particular, the at least one surrounding compartment 10 has a draft angle extending in one direction and the central compartment 8 has a draft angle extending in the opposite direction. In FIG. 5A this is illustrated in an exaggerated manner, where the direction of draw from the core of the mold is indicated with the arrows. In this FIG. 5A $\theta_c$ indicates the draft angle of the central compartment and $\theta_s$ the draft angle of the surrounding compartment. The inventors have found that in conventional infiltration units a thin walled column is subject to flattening by the side load it must withstand. The inventors have also found that with a vertical stack of infiltration units, the vertical (z direction) load is to be conducted from one unit to the next. A draft angle of cores in conventional molds for conventional infiltration units is necessary to be able to release the molded infiltration unit from the mold. The draft angle however, leads to a misalignment of pillar walls placed on top of each other. The inventors have found that if a minimal draft angle is achieved, the pillars are more effective in transferring load in a vertical direction, which therefore also reduces the side load on the units in a stacked structure. The inventors have found that by designing an internal structure, in which a central compartment 8 is surrounded by further compartments 10 which have a draft angle $\theta_s$ in the opposite direction to the draft angle $\theta_c$ of the central compartment 8, the draft angle necessary to be able to remove the molded unit 2 from the mold is sufficiently small that it does not cause extra wall thickness because the cores have parallel planes. In addition, the draft angle of the central compartment can be almost zero (tending to zero) if the surrounding cores for the surrounding compartments 10 are made with a greater draft angle on the outside. In particular, in one embodiment, the draft angle for the central compartment 8 and the surrounding compartments 10 extend in opposite directions. In this way, a minimum draft angle for the central compartment 8 can be achieved, which allows force to be more directly conducted from one infiltration unit 2 to another infiltration unit 2' when stacked on top of each other (see FIG. 7). As mentioned above, the rim 24, which is preferable disposed on the external distal end 16 of the pillar 6 and extends substantially in a horizontal plane (xy plane) around the pillar, conduct the vertical force from one unit to another in spite of a minimal draft angle.

With further reference, in particular, to FIGS. 5 to 7, the central compartment 8 preferably, has a draft angle which is substantially zero so that a vertical force is conducted from one unit 2 to another unit 2" when the units are stacked on one another.

The draft angle of the central compartment of the pillar of the plastic infiltration unit of the present invention varies in accordance with the length of the pillar. For example, for a pillar having a length of 60 cm, a substantially zero draft angle is preferably at the most 0.5 degrees, and more preferably, at the most 0.1 degrees. The smaller the draft angle, the greater the length of the pillar that can be achieved whilst maintaining efficient load transfer since the smaller the draft angle, the greater the overlap between the pillar 6 and the top deck 4 into which the pillar is inserted when the pillar 6 of one plastic infiltration unit is stacked on a second plastic infiltration unit. Thus, the greater the degree to which the load can be directly transferred from one plastic infiltration unit to another. Thus, the overall strength of the assembly is increased.

Further, in one embodiment, the plurality of compartments 8, 10 are open at at least one of said ends in a longitudinal direction of the pillar 6. In this way, liquid can readily drain through the pillars. This results in a more efficient infiltration or attenuation.

The arrangement of the plurality of compartments is not limited to that shown in the Figures. In particular, a variety of arrangements are envisaged. Preferably, at least one additional compartment 10 surrounds at least a part of the central compartment. In one embodiment (not shown in the Figures), the central compartment 8 and the at least one additional (further) compartment 10 are concentric around the longitudinal axis 12 (z axis).

In one embodiment as depicted for example, in FIGS. 5 and 6, the at least one additional compartment 10 includes a plurality of surrounding compartments 10 disposed around the central compartment 8. In particular, the surrounding compartments 10 are arranged to withstand a side load, wherein the side load is substantially perpendicular to a vertical load.

Further, the plurality of compartments 8, 10 may defined by at least one wall 40. In at least one of the intermediate portion 18 and the proximal portion 14 the at least one wall 40 has a thickness which is substantially constant in the longitudinal direction.

As mentioned above, at least one pillar may have a substantially quadrilateral (preferably, a square) cross section. The central compartment 8 may have a substantially cross shaped cross section and the surrounding compartments 10 may share at least one internal wall 42 with the central compartment 8.

A consequence of the draft angle of the central compartment being substantially zero is that the pillar has a substantially constant cross section along its length.

A further consequence of the draft angle of the central compartment being substantially zero is that the walls of the compartments are substantially parallel and thus, they have equal wall thickness. In one embodiment, the pillar is laterally, fully enclosed. Further the pillar may be provided with perforations.

In one embodiment, at least one of the surrounding compartments 10 may be joined to another of the surrounding compartments 10 along its length by a wall portion 44. In particular, the wall portion 44 may form one wall of the central compartment 8.

Further, the surrounding compartments 10 may include at least one groove 46 extending in a longitudinal direction in an outer wall 48. In this way, vertical buckling of the pillar 6 is prevented vertical buckling of the pillar 6.

In particular, the surrounding compartments 10 and the central compartment 8 share at least one internal wall portion 42. The at least one shared internal wall portion 42 may extend in at least one of an arc and a segmented arc between two points 50, 52 on an outer surface of the outer wall 48 of the pillar 6. In this way, rigidity is provided to the pillar.

In one embodiment, the corners 54 of the pillar 6 are rounded. For example, the surrounding compartments 10 may have at least one rounded outerwall (also referred to as corners 54) to prevent snagging of equipment on the pillar 6.

FIG. 7 shows a plurality of plastic infiltration units in accordance with the embodiment shown in FIGS. 1 to 6, in a stacked arrangement according to an embodiment of the invention.

In this embodiment, a first plastic infiltration unit 2 is for stacking with a second plastic infiltration unit 2'. In the stacked arrangement the foot 16 (not shown in the stacked arrangement of FIG. 7) of the first plastic infiltration unit is received in the socket 14 of the second plastic infiltration unit. In particular, in the stacked arrangement, the rim 24 defines a contact area between the first and second plastic infiltration units 2, 2', so that a vertical force exerted on the first plastic infiltration unit 2 is conducted directly to the second plastic infiltration unit 2'.

The number of infiltration units which can be stacked on one another is not limited to the number shown in Figures. It is envisaged that several infiltration units may be stacked on each other depending on the required circumstances of the infiltration or attenuation.

In one embodiment, a plurality of plastic infiltration units may be arranged to form a stack of plastic infiltration units. In the stack, the at least one pillar 6 of the at least one plastic infiltration unit is oriented in a downward direction (z direction). Further, the top deck 4 of a second plastic infiltration unit 2' forms a base plate of a first plastic infiltration unit 2 arranged above the second plastic infiltration unit 2' in the stack.

According to a further aspect of the present invention, a method of manufacturing an injection molded plastic pillar for an infiltration unit is provided. The method comprises forming a plastic pillar 6 having a central compartment 8 and at least one further compartment 10. The at least one further compartment 10 surrounds, at least in part, the central compartment 8. The at least one further compartment 10 extends in a same longitudinal direction as the central compartment 8 (see FIGS. 5 and 6). The method comprises: injecting plastic into a mold for the pillar 6, the mold comprising a core for the central compartment 8 and a core for the at least one further compartment 10. The core for the at least one further compartment in one direction is withdrawn and the core for the central compartment is withdrawn in a direction different from the one direction.

Preferably, the different direction is an opposite direction. By withdrawing the cores for the at least one further compartment 10 in an opposite direction, a constant wall thickness can be achieved.

In a further preferred embodiment, the step of withdrawing the core for the at least one further compartment is carried out before withdrawing the core for the central compartment.

The inventors have found that if the outer cores are withdrawn first, there is reduced pressure on the central core meaning that it can be withdrawn more easily, meaning that the draft angle for the central compartment can be reduced and even tend to zero. In this way, force can be more directly conducted from an upper infiltration unit 2 to a lower infiltration unit 2' when in a stacked arrangement without requiring more material or increasing weight of the infiltration units.

According to a further aspect of the present invention, there is provided a plastic base plate (also known as a "bottom plate") as shown in FIGS. 8 to 15.

The plastic base plate shown in FIGS. 8 to 15 is suitable for use with a plastic infiltration unit shown in FIGS. 1-7. An embodiment showing a system comprising an infiltration unit and a base plate is shown in FIG. 16.

The plastic base plate may be manufactured using injection molding from thermoplastic material.

Plastic base plates are known in the art. For example, a base plate is known from EP 19 32 975. A disadvantage with conventional base plates is that their thicknesses are determined in view of the vertical forces they are required to withstand. Generally, the thicker the conventional base plate, the more force it can withstand. This however, results in an increase in the materials required for the base plate, resulting in a higher cost.

It is an object of this yet further aspect of the invention, to provide a base plate in which the thickness can be reduced without compromising the performance of the base plate in terms of the forces it can withstand. It is a further object of this aspect of the invention to provide a base plate at a lower cost.

With reference to FIGS. 8 to 15, FIG. 8 shows a view of a plastic base plate for use with a plastic infiltration unit according to an embodiment of the invention. In particular, FIG. 8 shows a view of a plastic attenuation base plate for use with a plastic infiltration unit deployed for attenuation. FIG. 9 shows a view of a plastic base plate for use with a plastic infiltration unit according to an embodiment of the invention. In particular, FIG. 9 shows a view of a plastic infiltration base plate for use with a plastic infiltration unit deployed for infiltration. FIG. 10 shows a top view (bird's eye view) of a plastic base plate according to an embodiment of the invention. In particular, FIG. 10 shows an upper surface of the plastic base plate. In one embodiment (see FIGS. 8 to 10), there is provided a plastic base plate 100 for use with a plastic infiltration unit 2. The plastic base plate 100 comprises at least one receiving portion 102 for receiving at least one pillar 6 of a plastic infiltration unit 2 at a receiving location 104. The receiving portion 102 comprises a socket 106 and a shoulder portion 108. The shoulder portion 108 is disposed at a region surrounding at least a part of the socket 106. The shoulder portion 108 is formed so that the thickness (height) of the plastic base plate 100 is increased in the region surrounding at least a part of the socket 106, so that bending load on the base plate 100 is at least partly taken by the pillar 6 of the plastic infiltration unit 2 when it is located at the receiving location 102. In this way, the overall thickness of the base plate can be reduced resulting in an overall lighter base plate. Materials required for the base plate are less. As a result, the cost of the plastic base plate is reduced. The localized increase thickness which defines the shoulder portion 108 of the base plate 100 functions in such a way that a bending load on the base plate is at least partly borne by the at least one pillar 6 of the infiltration unit 2. In this way, whilst the shoulder portion 108 represents a localized increase in thickness of the base plate 100, overall the thickness, and hence overall weight and material, of the base plate 100 can be reduced since at least a proportion of the load on the base plate is transferred to the at least one pillar 6. As described above, the at least one pillar are constructed so as to withstand forces, in particular side forces and vertical forces. In particular, a load on the base plate is constrained in a fixed manner. Where a load is constrained in a fixed manner, the load is supported by compression against the shoulder portion 108 of the base plate.

As mentioned above, the plastic base plate shown in FIG. 8 is a base plate suitable for use as an attenuation base plate, that is, it is suitable for use in a buffer tank with heavy ground water loading. Such an attenuation base plate may have a closed structure which is constructed to transfer a load from the base plate to the at least one pillar. A closed structure is also provided for cleanability reasons. It is further constructed to prevent water from passing through the plate.

In contrast, the plastic base plate shown in FIG. 9 is a base plate suitable for use as an infiltration base plate. Generally, in comparison with an attenuation base plate, an infiltration base plate may be less loaded by pressure from below. Such an infiltration base plate may have an open structure which is constructed to allow water to pass through the plate. As seen in FIG. 9, the infiltration base plate 100 may be provided with at least one opening 112 to allow water to pass through the plate 100. However, it is to be noted, that the base plates may be used interchangeably.

In use, water pressure from below may cause the base plate 100 to bend in an upwards (z) direction in the centre of the plate. This causes a tensile stress in the base plate 100. The tensile stress experienced may be about 6 MPa. A consequence of the centre of the base plate 100 bulging in an upwards direction, is that the shoulder portion 108 of the base plate presses against the pillar 6. The pressing of the shoulder portion 108 against the pillar 6 is a compression stress. The magnitude of the compression stress may be about 6 MPa. It has been found that with such an arrangement when the underside of the base plate 100 considered, tensile stress beneath the pillar is seen, in spite of the side-load exerted on the base plate 100. It has been found that the feet of the pillar 6 lock the base plate 100 to provide resistance equal to the compression force.

In one embodiment, the plastic base plate 100 comprises an upper face 110 which extends substantially in a plane (xy plane). The at least one receiving portion 102 may be disposed in the upper face 110. Further, the plastic base plate 100 may comprise a plurality of receiving portions 102 located towards at least one of the edge 114, 116 of the upper face 110 and the corners 118 of the upper face 110.

In one embodiment, an inspection region is defined between the receiving portions. The inspection region is preferably dimensioned to allow inspection apparatus to be introduced into the inspection region. In particular, the inspection region is constructed to have a gutter 120 like shape in two directions perpendicular to each other. In this way, the inspection apparatus can be smoothly guided in the inspection region.

FIG. 11 shows a detail of receiving portion in cross section of the plastic base plate according to an embodiment of the invention. In one embodiment, at least one of an underside 122 of the base plate 100 and the at least one receiving portion 102 are provided with corrugated members 124 to absorb vertical and horizontal pressure of external water and soil.

FIGS. 12a and 12b show details of an underside view, of a plastic base plate according to an embodiment of the invention. In this embodiment, the underside 122 of the plastic base plate 100 in a region 126 around the at least one receiving region 102 is substantially flat to allow a vertical load to be transferred to the soil.

Further, the plurality of corrugated members 124 may form a plurality of pockets in the plastic base plate 100. Further, respective openings 128 may be provided, for example, in the form of holes, in the plurality of pockets to allow rainwater to escape from the plurality of pockets when the plastic base plate 100 is stored outside.

FIGS. 13 to 15 show details of a upper view of an upper surface of a plastic base plate according to embodiments of the invention. In one embodiment, the at least one receiving region 102 may comprise a plurality of vertical walls 130 which are arranged to align with an outer surface of the at least one pillar 6. In this way, load transfer between the at least one pillar 6 and the plastic base plate 100 is yet further improved. In a further embodiment, the plurality of vertical walls 130 includes at least one free standing wall 130. The at least one free standing wall 130 may be provided with a contact plane on which a slope 132 is formed. In this way, the pillar is prevented from sliding out of the receiving portion 102 when subject to a load.

In a yet further embodiment, as shown in FIG. 15, the shoulder portion 108 may be provided with at least one protruding portion 134 arranged to guide the pillar into the socket. In particular, the at least one protruding portion 134 is arranged to prevent the plastic base plate 100 from sliding over another plastic base plate when the plastic base plates are stacked on one another.

FIG. 14 shows a plastic infiltration system according to an embodiment of the invention comprising a plastic infiltration unit and a plastic base plate. In an embodiment of the invention, there is provided a plastic infiltration system for deployment underground comprising a plastic infiltration unit 2 as shown in and described in FIGS. 1 to 7 and a plastic base plate as shown in and described in FIGS. 8 to 15. In this embodiment, the at least one pillar 6 of the plastic infiltration unit is received at the receiving location 102 of the plastic base plate 100.

It is also envisaged to provide a system comprising a plurality of plastic infiltration units 2 as shown and described in FIGS. 1 to 7, arranged in use to form a stack extending in a vertical direction (z direction). In this embodiment, the plurality of plastic infiltration units 2 are stacked in a vertical direction (z direction) one on top of the other. Such an embodiment may include a single base plate 100 having at least one socket 106 for receiving a pillar 6. The single base plate 100 is disposed at the base of the stack and is arranged in use to receive in the at least one socket 106 at least one pillar 6 of a second plastic infiltration unit 2' and wherein the top deck 4 of the second infiltration unit 2' forms a base plate for a first infiltration unit 2 disposed above the second infiltration unit (see FIG. 7 also) and so on.

According to one embodiment, there is provided an assembly comprising at least two plastic infiltration units, including a first plastic infiltration unit and a second plastic infiltration unit. Each plastic infiltration unit comprises a top deck, at least one pillar for supporting the top deck, the at least one pillar extending from the top deck. The at least one pillar includes a plurality of compartments, wherein at least one of the compartments is laterally enclosed, and wherein the top deck and the at least one pillar are produced in one piece. The pillar may be weld free. In a further embodiment, the at least one pillar of the first plastic infiltration unit is insertable into the top deck of the second plastic infiltration unit. The assembly may further comprise a plastic base plate comprising: at least one receiving portion for receiving at least one pillar of the second plastic infiltration unit at a receiving location, the receiving portion comprising a socket and a shoulder portion disposed at a region surrounding at least a part of the socket, wherein the shoulder portion is formed so that the thickness (height) of the plastic base plate is increased in the region surrounding at least a part of the socket, so that bending load on the base plate is at least partly taken by the pillar of the plastic infiltration unit when it is located at the receiving location.

According to a further aspect of the present invention, there is provided plastic infiltration unit pillar 6. The pillar 6 may be comprised in the plastic infiltration unit of described above. The plastic infiltration unit pillar 6 comprises a plurality of compartments 8, 10 extending in a longitudinal direction (z direction). The pillar 6 has an internal structure comprising a central compartment 8 surrounded, at least in part, by at least one surrounding compartment 10. The at least one of the compartments 8, 10 is laterally enclosed. Further, the at least one surrounding compartment 10 has a draft angle extending in one direction and the central compartment 8 has a draft angle extending in the opposite direction. In one embodiment, the central compartment 8 has a draft angle, which is substantially zero so that a vertical force is conducted from one pillar 6 to another pillar 6' when the pillars 6, 6' are stacked on one another. In a yet further embodiment, the cross section of the pillar 6 is substantially constant along its length. As a result of the pillar having a substantially constant cross section along its length (in other words, in the longitudinal (z) direction), the length of the pillar can be increased with respect to conventional infiltration units because the strength of the pillar is constant along its length. Further, the length of the pillar can be adjusted. In other words, by using one production method, the possibility exists of providing pillars having various different lengths. To aid a user, in one embodiment, the pillar 6 includes markings to indicate a plurality of lengths to which the pillar can be adjusted by cutting. Once a pillar 6 has been cut to the desired length, a separate foot can be inserted into the cut end. To this end, in one embodiment, there is provided a system comprising a plastic infiltration unit pillar 6 and a foot for insertion into a plastic infiltration unit pillar which has been cut to an adjustable length.

FIGS. 17 a, b, c and d show a plastic infiltration unit side plate according to an aspect of the present invention. In particular, FIG. 17a shows a view of a plastic infiltration unit side plate 200 being mounted on a plastic infiltration unit 2 (see arrows). FIG. 17 b shows a front view (as seen by an observer when mounted on a plastic infiltration unit) of a plastic infiltration unit side plate according to an aspect of the present invention. FIG. 17c shows view of the inner facing side of the plastic infiltration unit side plate when the side plate is mounted on a plastic infiltration unit. FIG. 17d shows details of a cross section (in the z direction) of the plastic infiltration unit side plate. The side plate is for mounting in use on a plastic infiltration unit as hereinabove described.

According to a further aspect of the present invention and with reference to FIGS. 17a to d, there is provided a plastic infiltration unit side plate 200. The plastic infiltration unit side plate 200 is detachably mountable to a plastic infiltration unit 2. The detachably mounting means 202 may comprise a hinge attachment 202 for detachably mounting the plastic infiltration unit side plate 200 to a plastic infiltration unit 2. In this way, the plastic infiltration unit side plate 200 is held in position on the plastic infiltration unit 2.

In one embodiment, the plastic infiltration unit side plate further comprises a plurality of flow guiding structures 204 arranged to allow a fluid to flow with the aid of gravity through to the side plate 200. The plurality of flow guiding structures 204 may comprise a plurality of baffles 204 arranged in an interleaved manner so that a fluid drains through and off the side facing surfaces of the side plate 200.

Yet further, the plastic infiltration unit side plate 200 may comprise at least one attachment means 206 disposed on an inner facing surface 208 of the side plate 200 for providing a click fit of the side plate 200 to at least one pillar 6 of a plastic infiltration unit 2. In particular, the at least one attachment means 206 comprises at least one finger shaped protrusion 206 for insertion into a recess provided on the at least one pillar 6.

In one embodiment, the hinge attachment 202 is attachable to the top deck 4 of a plastic infiltration unit 2. In a further embodiment, the side plate 200 further comprises at least one foot 210 disposed on a lower edge 212 of the plastic infiltration unit side plate 200 to support a load exerted on the plastic infiltration unit side plate 200. Yet further, the side plate 200 may be dimensioned so that if it is cut in half it, it is dimensioned to form an end plate for attachment to an end side of a plastic infiltration unit 6. Further, the hinge attachment 202 is located so that if side plate is cut in half, the hinge attachment 202 detachably mounts the newly formed end plate to an end side of a plastic infiltration unit 2. In this way, a plate 200 is provided which may function as a side plate or an end plate depending only on how it is cut. The hinge attachment 202 and finger shaped attachment means 206 being provided on the plate 200 so that they cooperate with the infiltration unit 2 either on an end or on a side of the infiltration unit 2. In the embodiments described above, the side is defined as the side extending in the y direction and the end is defined as the side extending in the x direction. In the embodiments shown, the side (extending in the y direction) is longer than the end (extending in the x direction).

It is of course clear that the expression "produced in one piece" is to be understood as embracing or alternatively formulated as the following expressions, and that the following expressions may be interchangeable with the expression "produced in one piece": that the top deck and the at least one pillar are at least one of monolithic, uniform and/or integral, alternatively, that the infiltration unit is free from at least one of joins, seams, and/or interfaces, further alternatively, that the material of the top deck and the material of the pillar are continuous, yet further alternatively, that the top deck and the pillar are integrally connected, and yet further alternatively, that the top deck and the pillar are free from at least one of joins, seams, and/or interfaces.

The invention is not limited to the embodiments shown and described above.

The invention claimed is:

1. A plastic infiltration unit comprising:
a top deck,
at least two pillars for supporting the top deck, the at least two pillars extending from the top deck and each of the at least two pillars are integrally molded together with the top deck such that the top deck and the at least two pillars are produced in one piece, wherein each of the at least two pillars includes a plurality of compartments, wherein each of the at least two pillars has an internal structure comprising a laterally enclosed central compartment surrounded, at least in part, by at least one surrounding compartment, wherein the at least one surrounding compartment has a draft angle relative to a direction of draw of the surrounding compartment extending in one direction and the central compartment has a draft angle relative to a direction of draw of the central compartment, wherein the direction of draw of the surrounding compartment is opposite to the direction of draw of the central compartment, wherein the draft angle of the central compartment is substantially zero so that a vertical force is conducted from one unit to another unit when the units are stacked on one another and the at least one surrounding compartment has a draft angle which is non-zero.

2. The plastic infiltration unit according to claim 1, wherein the plurality of compartments are hollow columns extending in a longitudinal direction, and arranged with respect to one another to form each pillar.

3. The plastic infiltration unit according to claim 1, wherein the at least two pillars extend from the top deck in a longitudinal direction and the plurality of compartments extend along a longitudinal axis through a length of each pillar.

4. The plastic infiltration unit according to claim 1, wherein each of the at least two pillars has a proximal end and a distal end with respect to the top deck, and further comprises an intermediate portion located between the proximal end and the distal end.

5. The plastic infiltration unit according to claim 4, wherein the proximal end comprises a socket and the distal end comprises a foot and a rim disposed adjacent to the foot and extending around each of the pillars.

6. The plastic infiltration unit according to claim 5, wherein a first plastic infiltration unit is for stacking with a second plastic infiltration unit according to claim 1, wherein in a stacked arrangement the foot of the first plastic infiltration unit is received in the second plastic infiltration unit.

7. The plastic infiltration unit according to claim 6, wherein in the stacked arrangement, the rim defines a contact area between the first and second plastic infiltration units, so that a vertical force exerted on the first plastic infiltration unit is conducted directly to the second plastic infiltration unit.

8. The plastic infiltration unit according to claim 4, wherein:
the central compartment is open on at least one selected from the group of the proximal end and the distal end;
the at least one surrounding compartments are open on at least one selected from the group of the proximal end and the distal end;
at least one of the ends at which the central compartment is open is opposite to an end at which the surrounding compartments are open; and
the top deck has an opening corresponding to at least one of the proximal ends at which the central compartment and/or surrounding compartment are open.

9. The plastic infiltration unit according to claim 1, wherein each of the at least two pillars includes a side wall which defines an outerfacing surface of the plurality of compartments.

10. The plastic infiltration unit according to claim 1, wherein the top deck extends in a plane and a longitudinal direction of the at least two pillars is substantially perpendicular to the plane of the deck.

11. The plastic infiltration unit according to claim 1, wherein the top deck includes an upper facing surface and a lower facing surface and at least a part of each of the at least two pillars extends from the lower facing surface, wherein the at least two pillars are arranged to be interconnectable with an upper facing surface of a second infiltration unit to form a stack of infiltration units.

12. The plastic infiltration unit according to claim 3, wherein the central compartment and the at least one surrounding compartment are concentric around the longitudinal axis.

13. The plastic infiltration unit according to claim 3, wherein the at least one surrounding compartment includes a plurality of surrounding compartments disposed around the central compartment.

14. The plastic infiltration unit according to claim 1, wherein each of the at least two pillars is integratably formed in the top deck so that an upper end of each of the at least two pillars forms a part of the top deck into which a lower end of a second pillar is insertable.

15. The plastic infiltration unit according to claim 1, wherein the central compartment is formed so that a vertical force exerted on a first pillar of the at least two pillars in a first plastic infiltration unit is conducted directly to a second pillar in a second plastic infiltration unit when the first plastic infiltration unit is stacked on the second plastic infiltration unit by inserting a distal end of the first pillar into a proximal end of the second pillar.

16. The plastic infiltration unit according to claim 15, wherein the first pillar is an upper pillar and the second pillar is a lower pillar with respect to one another, wherein the first pillar has a contact area for contact with the lower pillar and the lower pillar has a contact area for contact with the contact area of the upper pillar, wherein the contact area of the upper pillar overlaps with the contact area of the lower pillar, so that a vertical force exerted on the upper pillar is conducted directly to the lower pillar.

17. The plastic infiltration unit according to claim 1, wherein each of the at least two pillars has a substantially quadrilateral cross section.

18. The plastic infiltration unit according to claim 1, wherein each of the at least two pillars has a substantially square cross section.

19. The plastic infiltration unit according to claim 1, wherein each of the at least two pillars has a constant cross section along its length.

20. The plastic infiltration unit according to claim 1, wherein each of the at least two pillars is laterally, fully enclosed.

21. The plastic infiltration unit according to claim 1, wherein each of the at least two pillars is provided with perforations.

22. The plastic infiltration unit according to claim 13, wherein the plurality of surrounding compartments are arranged to withstand a side load, wherein the side load is substantially perpendicular to a vertical load.

23. The plastic infiltration unit according to claim 4, wherein the plurality of compartments are defined by at least one wall, wherein, in at least one of the intermediate portion and the proximal end, the at least one wall has a thickness which is substantially constant in a longitudinal direction.

24. The plastic infiltration unit according to claim 1, wherein each of the at least two pillars has a substantially quadrilateral cross section, the central compartment has a substantially cross shaped cross section and the surrounding compartments share at least one internal wall with the central compartment.

25. The plastic infiltration unit according to claim 1, wherein the at least one surrounding compartment comprises a plurality of surrounding compartments, wherein at least one of the surrounding compartments is joined to another of the surrounding compartments along its length by a wall portion, wherein the wall portion forms one wall of the central compartment.

26. The plastic infiltration unit according to claim 1, wherein each of the at least two pillars has a plurality of corners, wherein the corners of each of the at least two pillars are rounded.

27. The plastic infiltration unit according to claim 1, wherein the at least one surrounding compartment has at least one rounded outerwall to prevent snagging of equipment on each of the at least two pillars.

28. The plastic infiltration unit according to claim 1, wherein the at least one surrounding compartment includes at least one groove extending in a longitudinal direction in an outer wall to prevent vertical buckling of each of the at least two pillars.

29. The plastic infiltration unit according to claim 1, wherein the at least one surrounding compartment and the central compartment share at least one internal wall portion, wherein the at least one shared internal wall portion extends in at least one of an arc and a segmented arc between two points on an outer surface of each of the at least two pillars to provide rigidity to each of the at least two pillars.

30. The plastic infiltration unit according to claim 29, wherein at least one wall of the central compartment is provided with at least one hole for allowing liquids to drain from the plastic infiltration unit when the plastic infiltration unit is in storage.

31. The plastic infiltration unit according to claim 1, wherein the plastic infiltration unit is weld free.

32. A plurality of plastic infiltration units according to claim 1, arranged in use to form a stack of plastic infiltration units, wherein in the stack, each of the at least two pillars of a first plastic infiltration unit is oriented in a downward direction, and wherein the top deck of a second plastic infiltration unit forms a base plate of the first plastic infiltration unit arranged above the second plastic infiltration unit in the stack.

33. A system comprising a plurality of plastic infiltration units according to claim 1, arranged in use to form a stack, wherein the plurality of plastic infiltration units are stacked in a vertical direction one on top of the other, the system further comprising a single base plate having at least two sockets, each for receiving a pillar, wherein the single base plate is disposed at the base of the stack and is arranged in use to receive in the at least two sockets at least two pillars of a lower plastic infiltration unit, and wherein the top deck of the lower infiltration unit forms a base plate for an upper infiltration unit disposed above the lower infiltration unit.

34. A plastic infiltration system for deployment underground comprising the plastic infiltration unit according to claim 1 and a plastic base plate, wherein the plastic base plate comprises at least two receiving portions for receiving at least two pillars of the plastic infiltration unit at a receiving location, wherein each of the at least two pillars of the plastic infiltration unit is received at one of the at least two receiving locations of the plastic base plate.

35. The plastic infiltration unit according to claim 1, further comprising a plastic infiltration unit side plate comprising a hinge attachment for detachably mounting the plastic infiltration unit side plate to the plastic infiltration unit, the plastic infiltration unit side plate further comprising a plurality of flow guiding structures arranged to allow a fluid to flow with the aid of gravity through to the side plate.

36. The plastic infiltration unit according to claim 1, wherein at least one wall of the central compartment is provided with at least one perforation.

37. An assembly comprising at least two plastic infiltration units, including a first plastic infiltration unit and a second plastic infiltration unit, wherein each plastic infiltration unit comprises a top deck, at least two pillars for supporting the top deck, the at least two pillars extending from the top deck and each of the at least two pillars are integrally molded together with the top deck such that the top deck and the at least two pillars are produced in one piece, wherein each of the at least two pillars includes a plurality of compartments, wherein each of the at least two pillars has an internal structure comprising a laterally enclosed central compartment surrounded, at least in part, by at least one surrounding compartment, wherein the at least one surrounding compartment has a draft angle relative to a direction of draw of the surrounding compartment extending in one direction and the central compartment has a draft angle relative to a direction of draw of the central compartment, wherein the direction of draw of the surrounding compartment is opposite to the direction of draw of the central compartment, wherein the draft angle of the central compartment is substantially zero so that a vertical force is conducted from one unit to another unit when the units are stacked on one another and the at least one surrounding compartment has a draft angle which is non-zero.

38. The assembly according to claim 37, wherein each of the at least two pillars of the first plastic infiltration unit is insertable into the top deck of the second plastic infiltration unit.

39. The assembly according to claim 37, further comprising a plastic base plate comprising: at least two receiving portions for receiving at least two pillars of the second plastic infiltration unit at a receiving location, the at least two receiving portions each comprising a socket and a shoulder portion disposed at a region surrounding at least a part of the socket, wherein the shoulder portion is formed so that a thickness of the plastic base plate is increased in the region surrounding the at least the part of the socket, so that a bending load on the base plate is at least partly taken by one of the at least two pillars of the second plastic infiltration unit when it is located at the receiving location.

40. The assembly according to claim 37, wherein at least one wall of the central compartment is provided with at least one perforation.

41. A method of manufacturing an injection molded plastic pillar for an infiltration unit, the method comprising:
    forming at least two plastic pillars each having a laterally enclosed central compartment and at least one surrounding compartment, wherein the at least one surrounding compartment surrounds, at least in part, the central compartment, wherein the at least one surrounding compartment extends in a same longitudinal direction as the central compartment,
    injecting plastic into a mold for the at least two pillars, the mold comprising a first core for each of the central compartments and a second core for each of the at least one surrounding compartments,
    withdrawing the second core for each of the at least one surrounding compartments in a first direction of draw, and withdrawing the first core for each of the central compartments in a second direction of draw opposite to the first direction, wherein the central compartment has a substantially zero draft angle with the second direction of draw and the surrounding compartment has a draft angle with the first direction of draw which is larger than the draft angle of the central compartment, and wherein the draft angle with the second direction of draw is between 0 and 0.5 degrees.

42. The method according to claim 41, comprising withdrawing the second core for the at least one surrounding compartment before withdrawing the first core for the central compartment.

43. The method according to claim 41, wherein at least one wall of the central compartment is provided with at least one perforation.

* * * * *